(12) United States Patent
Cort

(10) Patent No.: US 7,255,793 B2
(45) Date of Patent: *Aug. 14, 2007

(54) METHODS FOR REMOVING HEAVY METALS FROM WATER USING CHEMICAL PRECIPITATION AND FIELD SEPARATION METHODS

(76) Inventor: Steven L. Cort, 411 Bathgate La., Cary, NC (US) 27513

( * ) Notice: Subject to any disclaimer, the term of this patent is extended or adjusted under 35 U.S.C. 154(b) by 71 days.

This patent is subject to a terminal disclaimer.

(21) Appl. No.: 11/135,644

(22) Filed: May 24, 2005

(65) Prior Publication Data

US 2005/0258103 A1 Nov. 24, 2005

Related U.S. Application Data

(63) Continuation-in-part of application No. 10/152,024, filed on May 22, 2002, now Pat. No. 6,896,815.

(60) Provisional application No. 60/352,265, filed on Jan. 30, 2002, provisional application No. 60/330,973, filed on Nov. 5, 2001, provisional application No. 60/294,022, filed on May 30, 2001.

(51) Int. Cl.
*C02F 1/48* (2006.01)
*C02F 101/20* (2006.01)

(52) U.S. Cl. ............... 210/695; 210/705; 210/711; 210/713; 210/714; 210/725; 210/727; 210/912; 210/913; 210/914

(58) Field of Classification Search ............... 210/695
See application file for complete search history.

(56) References Cited

U.S. PATENT DOCUMENTS 3,637,490 A * 1/1972 Gardner et al. ............. 210/705
3,697,420 A * 10/1972 Blaisdell et al. ............. 210/695
3,740,331 A 6/1973 Anderson .................. 210/727
3,959,145 A * 5/1976 Lundquist et al. .......... 210/223

(Continued)

OTHER PUBLICATIONS

Dept. of the Army Manual 1110-1-4012, p. 2-2 Chemical Engineering, v. 104, issue 2, p. 66 (1997).

(Continued)

*Primary Examiner*—Peter A. Hruskoci
(74) *Attorney, Agent, or Firm*—Michael de Angeli

(57) ABSTRACT

A two-step chemical precipitation process involving hydroxide precipitation and sulfide precipitation combined with "field separation" technology such as magnetic separation, dissolved air flotation, vortex separation, or expanded plastics flotation, effectively removes chelated and non-chelated heavy metal precipitates and other fine particles from water. In the first-step, the non-chelated heavy metals are precipitated as hydroxides and removed from the water by a conventional liquid/solids separator such as an inclined plate clarifier to remove a large percentage of the dissolved heavy metals. The cleaned water is then treated in a second precipitation step to remove the residual heavy metals to meet discharge limits. In the second precipitation step, any metal precipitant more effective than hydroxide for metal precipitation can be used. The invention improves metal removal, lowers cost because fewer chemicals are used, produces less sludge, and reduces the discharge of toxic metals and metal precipitants to the environment. Magnetic separation is preferred for the separation of particles precipitated in the second stage. Similar methods can be employed for separation of other particulates from water. Particulates can also be removed by causing them to adhere to particles of expanded plastic, forming a floc lighter than water, so that the floc can be removed by flotation.

34 Claims, 10 Drawing Sheets

U.S. PATENT DOCUMENTS

| | | | | |
|---|---|---|---|---|
| 3,980,562 | A | | 9/1976 | Nilsson ...................... 210/222 |
| 4,039,447 | A | * | 8/1977 | Miura et al. ................. 210/425 |
| 4,329,224 | A | | 5/1982 | Kim ........................... 210/709 |
| 4,422,943 | A | | 12/1983 | Fender ....................... 210/716 |
| 4,432,880 | A | | 2/1984 | Talbot ........................ 210/725 |
| 4,981,593 | A | | 1/1991 | Priestley et al. ............ 210/613 |
| 5,000,853 | A | | 3/1991 | Reischl et al. .............. 210/616 |
| 5,441,648 | A | | 8/1995 | Lidzey ....................... 210/695 |
| 5,453,188 | A | * | 9/1995 | Florescu et al. ............ 210/222 |
| 5,505,857 | A | | 4/1996 | Misra et al. ................ 210/709 |
| 5,660,735 | A | | 8/1997 | Coltrinari et al. ........... 210/723 |
| 6,036,857 | A | * | 3/2000 | Chen et al. ................. 210/222 |
| 6,099,738 | A | | 8/2000 | Wechsler .................... 210/695 |
| 6,890,431 | B1 | * | 5/2005 | Eades et al. ............. 210/195.1 |
| 6,896,815 | B2 | * | 5/2005 | Cort ........................... 210/695 |
| 2003/0082084 | A1 | * | 5/2003 | Cort ........................... 423/25 |

OTHER PUBLICATIONS

Tsouris et al, "Electrocoagulation for magnetic seeding of colloidal Particles," Colloids and Surfaces A(2000) (preprint).

Tsouris et al, "Flocculation of Paramagnetic Particles in a Magnetic Field", J. Colloidal and Interface Science 171, 319-330 (1995).

Chin et al, "Shear-Induced Flocculation of Colloidal Particles in Stirred Tanks," J. Colloid and Interface Science 206, 532-545 (1998).

Ying et al, "High-gradient magnetically seeded filtration" Chemical Engineering Science 55 (2000) 1101-1113.

* cited by examiner

Section 7-7

Section 8-8

Section 9-9

METHODS FOR REMOVING HEAVY METALS FROM WATER USING CHEMICAL PRECIPITATION AND FIELD SEPARATION METHODS

CROSS-REFERENCE TO RELATED APPLICATIONS

This application is a continuation-in-part of and claims priority from Ser. No. 10/152,024, filed May 22, 2002, issuing May 24, 2005, as U.S. Pat. No. 6,896,815. Ser. No. 10/152,024 in turn claimed priority from three provisional patent applications, Ser. Nos. 60/294,022 filed May 30, 2001, 60/330,973, filed Nov. 5, 2001, and 60/352,265, filed Jan. 30, 2002.

BACKGROUND OF THE INVENTION

The three provisional patent applications referred to above were combined into one patent application, Ser. No. 10/152,024, because they all dealt with two-step chemical precipitation and "field separation" technologies to remove fine metal precipitates from water, which was the focus of parent application Ser. No. 10/152,024. This remains an important aspect of the invention of this continuation-in-part application; however, this application is also directed to other aspects of the invention, as will appear more fully below. Thus, in the following disclosure, two-step precipitation processes for removing heavy metals from water are discussed first, with the other aspects of the invention being discussed later.

The removal of heavy metals from water is an important aspect of water treatment. There are many technologies for accomplishing this; however, one of the most cost effective means is chemical precipitation. "Chemical precipitation", as used herein and generally in the art, refers to reacting dissolved metals with an additive chemical of some sort so that the metals to be removed are rendered insoluble, so that they can then be separated from the water. Raising the pH to a neutral or an alkaline level will precipitate most heavy metals as metal hydroxides. However, hydroxide precipitation is usually not effective enough to meet strict new discharge limits. Metal hydroxides are not insoluble enough to meet these limits and metal ions that are chelated will not precipitate at all. Therefore, more advanced treatments such as reaction with organic or inorganic sulfides must be used. These chemistries will produce metal sulfides that have lower solubility than hydroxides and will break chelate bonds to allow the metals to precipitate.

The Department of Army Engineering and Design Manual No. 1110-1-4012 on page 2-2 (Precipitation/Coagulation/Flocculation), shows the difference between the solubility of metal hydroxides and metal sulfides. Under ideal conditions, the optimum metal hydroxide solubility ranges from $10^2$ to $10^{-2}$ mg/L. Under ideal conditions, the optimum metal sulfide solubility ranges from $10^{-2}$ to $10^{-12}$ mg/L.

If all the metals (chelated and non-chelated) are precipitated with sulfide chemicals in a one-step precipitation, the removal is complete, but the cost of treatment is high, often prohibitively high for waste streams containing high concentrations of heavy metals. If most of the metals are first removed as metal hydroxides in a first-step precipitation, and the remaining metals are polished out in a second-step precipitation, the removal of metals is improved and the cost of treatment is much lower. This patent application shows that it is beneficial to use selected "field separation" methods that have not been used or contemplated before in combination with this two-step precipitation process.

The concept of removing heavy metals using sulfides and ferrous compounds was described by Anderson in U.S. Pat. No. 3,740,331. However, Anderson fails to suggest refinements and additions provided by the present invention that make this basic technique cost-effective in today's processing environment. Specifically, Anderson does not suggest that removing metals can be performed more efficiently if the heavy metals are removed in a two-step precipitation process. The teachings of the Anderson patent are simply that using ferrous compounds with sulfides will result in better metal removal. No suggestion is made to use "field separation" methods effective in removing fine and fragile metal precipitates.

The fundamental disadvantage of doing a sulfide precipitation according to Anderson is that it produces very fine colloidal particles that are hard to remove. The present inventor attempted to remove these particles with a sand filter or with a one micron sized back-washable filter and was unsuccessful.

Fender, in U.S. Pat. No. 4,422,943, describes the use of iron pyrite as a source of sulfide to precipitate heavy metals as metal sulfides. He also describes the benefits of using a two-step precipitation process. In claim 2, Fender describes the step of separating precipitated sulfides by filtration (specifically, sand filtration), but does not contemplate using the "field separation" methods described in this application. However, to accomplish filtration, he uses a polymer to increase the particle size so the sand filter can remove the metal sulfides. It is known in the art that using an organic polymer to increase the size of the metal sulfide precipitates will cause fouling problems with sand filters. The "field separation" methods covered by this patent application are not subject to fouling, as are filters. Furthermore, sand filters have a limitation on the size of particles that can be removed; even a well designed multi-media sand filter can remove particles only down to about 20 microns in size. Metal sulfide precipitation will produce colloidal-sized particles of less than one micron in size, which will pass through a sand filter.

With the exception of microfiltration which can remove sub-micron sized particles, the present inventor has found no filtration equipment capable of consistently and economically removing fine metal sulfide particles. More specifically, the present inventor has experimented with a back washable filter manufactured by Asahi. It had a plastic-mesh filtering element with a one micron opening size. This was significantly smaller than the metal sulfide precipitates, judged to be at least 30 microns because they were visible to the naked eye. However, even low operating pressures (about 10 psi), were sufficient to deform the shape of the metal sulfide precipitates and force these >30 micron sized particles through one micron sized openings.

The only commonality between this patent application and the Fender patent is they both recognize the economic importance of using a two-stage precipitation process, which is known art. In summary, this application deals with other forms of soluble and insoluble sulfide treatment rather than iron pyrite and "field separation" equipment rather than filters, which is an improvement on the Fender patent. Further, the Fender patent only deals with iron pyrite as a source of sulfide to precipitate heavy metals; the present application deals with other sulfides that are known to produce small metal sulfide particles that are difficult to filter.

The art recognizes a difference between filtration equipment and "field separation" equipment, as discussed in the Chemical Engineering document dated February 1997, Volume 104, Issue 2, Page 66. Filtration equipment includes: straining, cake filtration, deep bed filtration, and membrane filtration and always involves a physical barrier that prevents the passage of particles over a specific size. "Field separation" techniques include gravitational settling, centrifugal settling, hydrocyclone separation, dissolved air flotation, expanded plastics flotation, and magnetic separation. The difference is that filtration involves a physical barrier to capture particles while "field separation" involves force fields, provided by inter-molecular, gravitational, centrifugal, and/or magnetic forces to separate particles from water.

U.S. Pat. No. 6,099,738 to Wechsler deals with a method and system for removing solutes from a fluid using magnetically conditioned coagulation. This method includes the steps of magnetically conditioning the fluid by applying a magnetic field to enhance the precipitation of solute particles for coagulation; adding a coagulant to the fluid before, during, and after application of the conditioning magnetic field to coagulate the increased available solute particles to form colloids; and collecting the colloids for removal from the fluid. Wechsler neither contemplates combining magnetic seeding and polymer addition with a two-step metal precipitation process as a means for efficiently removing heavy metals from wastewater, nor combining magnetic separation principles with gravity settling in one treatment vessel, as described herein.

According to the present invention, any magnetic separation method can be used; however, in the preferred embodiment the magnetic separator used to capture the magnetic particles is mounted in the treatment tank rather than as a separate collection device, which is novel. This approach has three advantages: (1) one less piece of equipment is needed, (2) the system can be cleaned without interrupting the water flow, and (3) permanent magnets can be used rather than electromagnets.

Magnetic seeding is used in some embodiments of the present invention to remove precipitated pollutants and other non-magnetic particles from water. Magnetic seeding is known per se for such purposes. Specifically, the Department of Energy published studies (C. Tsouris, et. al., Electrocoagulation for magnetic seeding of colloidal particles, *Physiochem Eng. Aspects* (accepted paper) December 1999; C. Tsouris, et. al., Flocculation of paramagnetic particles in a magnetic field, *Journal of Colloid and Interface Science*, 171, 319-330; T-Y Ying et. al., High-gradient magnetically seeded filtration, *Chemical Engineering Science* 55 (2000) 1101-1113) addressing the effectiveness of magnetic seeding to remove colloidal sized particles. The DOE investigators studied magnetically seeded solid/liquid separation combining magnetic seeding under turbulent-shear flow conditions with high field gradient magnetic filtration. They concluded that magnetic seeding was effective in removing fine particles. They used seed particle concentration, solution pH, and ionic strength parameters that determine the zeta-potential of particles to significantly affect the particle removal performance. They did not use organic polymers to bind the magnetic seed materials to the low-magnetic particles to enhance removal, and did not apply magnetic seeding and filtration principles to the second step of a two-step metal precipitation process using sulfide precipitants.

Nilsson U.S. Pat. No. 3,980,562 shows an apparatus for magnetic separation, including a device for removal of accumulated particles from magnetic disks used to collect the particles. More specifically, Nilsson teaches that suspended particles and high molecular weight substances can be removed from water by adding a ferromagnetic particulate to the water and using a magnetic field to separate the combined particles. Nilsson also suggests addition of chemical "flocking agents", giving as example lime, alum, iron chloride, polyelectrolytes and water glass. Col. 1 lines 10-28. These materials are properly referred to as coagulants, in that they affect the charge of the particles, as compared to the polymer flocculants used in practice of the present invention, which attach particles with long chain polymers as discussed below. Nilsson shows collecting the magnetized particles on opposed walls of disks enclosing permanent magnets, and then scraping them off onto a conveyor belt for disposal. A sector of the disks may be provided without magnets, to facilitate the scraping. Col. 5, lines 18-20. In the Nilsson design, the sector provided without magnets is located at the top of the collector magnet disks because this is the location of the conveyor belts removing the scraped magnetite. However, in the present invention, the sector that is free of magnets is located at the bottom of the collector magnet disk so that after the magnetite is scraped off the disk, it settles by gravity to the bottom of the settling chamber (74).

In researching the present work, the present inventor found that a strong enough bond between the magnetic seed material and the non-magnetic metal sulfide precipitates to enable reliable separation could not be achieved unless a flocculating polymer was also used. The polymer binds the magnetic seed material together with the fine metal sulfide particles so they can be removed by a low field strength magnetic separator or by gravity settling.

Another novel approach of this present patent is the removal of fine precipitates formed, for example, in the second step of this two-step precipitation process, by the use of expanded plastics to enhance flotation. The present inventor successfully attached fine metal precipitates to expanded polystyrene (EPS) with a flocculating polymer. The EPS, having the precipitates attached thereto by the flocculating polymer, floats, allowing the metal precipitates to be removed from the waste stream. The same "EPS flotation" technique of the invention can be used to remove particulates from other water streams, e.g., remove dirt from stormwater runoff.

The concept of enhanced flotation using highly buoyant EPS is similar to the principle used in dissolved air flow (DAF) equipment. DAF uses micro-bubbles to float fine particles out of water, while (in at least one embodiment) the present invention uses an expanded plastic like EPS; this eliminates the energy cost involved with compression of air to form the micro-bubbles.

To date, two-step precipitations have been rarely used because they require additional equipment and space. This level of treatment was not necessary because existing regulatory limits could be achieved with a one-step hydroxide precipitation. However, with tighter regulations, a two-step precipitation process is now justified but the traditional clarification approach is often infeasible because of the high residence times required which involve substantial cost and space requirements. According to the present invention, the extensive tankage and time requirements of conventional settling techniques are replaced with more sophisticated separation techniques which result in a faster, more space-efficient, and less expensive process.

The present invention describes better ways to do a two-step precipitation that is less costly and requires less equipment than a traditional clarifier yet is able to handle the metal precipitates gently, so as to prevent their breakup.

BRIEF SUMMARY OF THE INVENTION

It is the object of this present invention to provide a cost- and chemically-effective process for treating wastewater and all waters requiring the removal of metal precipitates or other fine particles.

A fundamental aspect of the present invention is the use of "field separation" methods, especially magnetic separation or ESP flotation; for example, these separation techniques can be employed to remove particulates created by a two-step chemical precipitation process for heavy metal removal, to remove particulates created by a one-step method for removing other fine pollutant particles, or simply to remove suspended solids from water.

As applied to the removal of heavy metals from water, particularly to the removal of cadmium, chromium, copper, lead, mercury, nickel, and zinc, the present invention pertains to combining methods for precipitating heavy metals in an efficient two-step chemical precipitation process (preferably hydroxide and sulfide precipitation steps) with improved methods for removing the fine metal precipitates produced in each precipitation stage.

More specifically, the process disclosed by the present application provides an effective way to remove fine metal sulfide precipitates and metal hydroxide precipitates, which in turn makes it possible to effectively use a two-step precipitation method. The two-step precipitation method reduces chemical costs, reduces the amount of sludge produced, allows metals to be recycled, and reduces the amount of metals discharged to the environment.

The first step of the invention as implemented for this purpose is to precipitate non-chelated metals as metal hydroxides. This requires the pH to be raised as necessary to reach an optimum precipitation point for the metals in question. This typically is in the 6-10 pH range. However, as the pH of wastewater must generally be adjusted to be in the 6-9 pH range before it can be discharged, precipitating the heavy metals as hydroxides according to this aspect of the present invention does not significantly increase treatment cost. When this first step is completed, most (85% to 95% depending on the level of chelating agents present in the wastewater) of the heavy metals will precipitate as metal hydroxides. Any alkaline material can be used to raise the pH in the first step of the process. Alkaline materials that are lower in cost and form less sludge are preferred. Suitable alkaline materials are lime, limestone, caustic soda, soda ash, or magnesium hydroxide.

The conventional approach for metal removal is the one-step precipitation process described above. As typically implemented, this process normally requires a pH control tank, a floc tank, a clarifier, and a final filter. The main disadvantage of a one-step precipitation process is that it either cannot meet the discharge limits if hydroxide precipitation is practiced, cannot effectively remove metal hydroxides that precipitate at different pH's, or it is very costly if sulfide treatment is practiced when metal concentrations are high.

This present invention solves these problems and provides a better and more cost effective method for removing dissolved metals from water. The invention is an improvement over a one-step precipitation process because it reduces chemical usage, produces less sludge, and gets better metal removal. Chemical usage is reduced because all the metals are not precipitated with sulfide chemicals. Sludge quantities are reduced because smaller amounts of chelate-breaking chemicals, such as ferrous compounds, are needed in a two-step precipitation. Since most of the metals are recovered in the hydroxide form, they can easily be recovered by electrowinning and hydrometallurgical processing techniques. The amounts of metals released into the environment are less because sulfide chemicals can produce lower metal concentrations when a first stage hydroxide precipitation process lowers the starting concentration of the metals.

Several embodiments of the invention involving two-step precipitation techniques for removing heavy metals are described. In all embodiments, the first step of the metal removal process is hydroxide precipitation and removal with a clarifier or other suitable "field separation" device. The second step of the process is preferably sulfide precipitation followed by a second "field separation" method capable of removing fine particles in the range 0.1 to 100 microns. The "field separation" process chosen must be capable of removing small fragile metal precipitates. According to a further aspect of the invention, similar processes can also be employed for separating particulates other than metal precipitates per se from water, e.g., separating silt from storm water.

Until now, there have been few applications for two-step precipitation processes; the applicable regulations are considered to be liberal by many, so that one-step precipitation is usually sufficient. In the few known applications with two-step precipitation, clarification using gravity settling was practiced; more specifically, processes using hydroxide precipitation and clarification followed by sulfide precipitation and clarification have been employed. According to one aspect of the present invention, hydroxide clarification and/or sulfide precipitation is followed by other field separation methods, including magnetic separation or expanded polystyrene separation.

Such sophisticated separation techniques are required because the metal precipitates are fragile and will break or deform when aggressively filtered. For example, the present inventor attempted to use so-called "dead end" filtration using a back-washable filter manufactured by Asahi. It was not successful because the pressure across the filtration element was too great (greater than 10 psi), causing the fragile metal precipitates to deform and break through the filter cloth.

The present inventor also attempted to remove fine sulfide precipitates in a sand filter. The particles were too small and exceeded the limit of the sand filter to remove particles smaller than 10 microns.

Clarifiers are not well suited for the light solids loading found in polishing applications because they are dependent upon the type and frequency of collisions between the particles. Clarifiers are also large in size and cannot fit into many existing facilities.

The following "field separation" processes have been tested and found, with some modification according to the invention, as discussed below, to be suitable when used in combination with a two-step precipitation process.

Magnetic Separation:

The process and apparatus of this present invention accomplish the efficient removal of fine particles from water by using gravitational and magnetic forces in one treatment vessel. A magnetic seed material is necessary when the fine particles to be removed do not possess magnetic properties, and a flocculating agent is necessary to bind the magnetic seed material to the non-magnetic particles.

The magnetic separation techniques used according to this aspect of this invention, as illustrated in FIG. 1, is optimized for the removal of precipitated heavy metals from water, but the apparatus and process of this invention will remove a wide variety of suspended solids from water.

A required step in the chemical precipitation of heavy metals from water is to precipitate the metals as either hydroxides or sulfides, by pH adjustment or the addition of a sulfide precipitant, respectively. These metal precipitates are small and fragile and require gentle liquid/solid separation methods. Furthermore, such metal precipitates generally do not exhibit magnetic properties. Therefore, in this embodiment of the invention, a magnetic seed material, preferably magnetite ($Fe_3O_4$), is added to the non-magnetic metal precipitates. A flocculation agent, preferably an anionic polymer, is added to ensure that the magnetite is attached to the metal precipitates. This attachment process provides a magnetic anchor for the heavy metal precipitates and allows those particles that are not normally magnetic to be removed by a magnetic separator.

The addition of the anionic polymer, preferably a polyacrylamide based polymer A3040L sold by Stockhausen, causes the mixture of metal precipitates and magnetite particles to flocculate. Because the magnetite is heavy, the majority of the flocculate quickly settles to the bottom of the treatment vessel, becoming a sludge that can be removed and dewatered. Gentle agitation of the solution promotes flocculation by keeping the heavy magnetite particles in suspension at the bottom of the treatment vessel to improve the flocculation and the absorption process of dissolved heavy metals. This gentle agitation can be caused by mechanical mixing or by a naturally induced vortex action. However, caused by the upward flow of water, some particles, particularly those of smaller size, will be carried to the top of the treatment vessel. According to another aspect of the invention, a magnetic separator (detailed in connection with FIGS. 5-10 below) captures these rising fine magnetic particles before they are discharged. By comparison, in the absence of the magnetic separator, given sufficient time, all of the flocculated fine particles would settle out by gravity, but depending on the nature of the particles, this could take a long time and would necessitate greatly increasing the size of the treatment vessel. As the flow through the treatment vessel increases, there are even greater upward forces on these fine particles preventing them from settling. Since the magnetic separator can capture the magnetic particles at high velocities, the fine particles can be allowed to rise in the treatment vessel. This allows the treatment vessel to be smaller which results in higher water velocities. Thus, the combination of gravity settling at the bottom of the treatment vessel and magnetic separation at the top of the treatment vessel reduces the size of the equipment and allows the inventive process to remove fine particles, whether they have a tendency to sink or to float.

A bench scale system was constructed with a five-gallon tank, a variable speed mixer, and a permanent magnet. A mixture of metal sulfides, magnetite, and polymer were added to the tank and the variable speed mixer set at a moderate speed. This flocculated the mixture and the density of the flocculated particles caused most of them to settle rapidly to the bottom of the tank. The speed of the mixer was slowed until only a relatively small percentage of the particles were suspended. Water was injected into the tank at a rate of 2.5 gallons per minute and excess water was discharged from the top of the tank. A permanent magnet was placed at the discharge point and collected the suspended particles, leaving the discharge water almost completely free of suspended particles. When the magnet was removed, the quantity of particles discharged was unacceptably high. This test demonstrated that a permanent magnet could be employed to remove a high percentage of magnetic particles from a moving stream of water. It showed that placing the magnet in the same treatment tank where gravity settling occurs reduces capital cost and allows the system to operate continuously. The magnet is so effective at removing particles comprising various undesirable components flocculated with magnetite particles that a high wastewater throughput is possible through a small sized system. For example, the Surface Over Flowrate (SOR) measured in gallons per minute per square foot of surface area for a traditional clarifier is usually between 0.25 and 1. The SOR for the gravity settling zone (74) of the inventive process is 8-10 and the SOR for the final magnetic collector (76) is ten times this level or about 80-100.0036

Another pilot-scale system was tested to better evaluate the benefit of high throughput capacity and the ability to capture the magnetic particles with a collection of permanent magnets. The pilot scale system had a capacity of 15 gallons and at the discharge point bar magnets were placed in a trough. The bar magnets were constructed of a ceramic material and were laid flat in the trough with the water containing the magnetic particles flowing through the trough and over the bar magnets. Tests showed that the system could operate at a flow rate of at least 10 gallons per minute with no visible discharge of magnetic particles. At 15 gallons per minute, the residence time for the system would be one minute. This compares very favorably with other ballast aided clarification systems; for example, the Actiflo system manufactured by US Filter requires a residence time of between 10 and 15 minutes.

In the preferred embodiment, detailed in FIGS. 5-10, discussed below, the magnetic separator is cleaned continuously. In one embodiment, the magnetic separator consists of several round disks mounted on a revolving shaft. A stationary scraper blade removes the heavy deposits of magnetic material from the revolving magnets. The removed sludge quickly settles to the bottom of the treatment vessel and is not re-entrained into the water flow. This is because the collected particles retain a magnetic charge imparted from the permanent magnets, causing the particles to clump together. Therefore they quickly settle and are withdrawn and circulated for reuse or recovery.

The flocculating polymer forms a bond between the magnetite and the metal precipitate sufficient to withstand the forces of gentle flow, magnetic separation, and gravity settling. However, under high-shear mixing, the bond between the magnetite and metal precipitate is broken, allowing the magnetite to be reused. The liberated magnetite is either separated from the metal precipitate by gravity or by magnetic forces. The cleaned magnetite is reused and the remaining metal precipitates are removed from the system and dewatered with appropriate dewatering equipment.

The precipitated metals or other fine particles can also be separated from the magnetite chemically. Magnetite is chemically stable and does not measurably dissolve with pH adjustment. This is not the case with some metal precipitates. For example, metal hydroxides can be easily dissolved by pH adjustment. Therefore, a mixture of magnetite and metal hydroxide precipitates can be easily separated by pH adjustment. Once the metal hydroxide particles are dissolved, the magnetite can then be easily separated and returned to the wastewater treatment system for reuse. The dissolved metals then can be re-precipitated and filtered out of the wastewater for disposal or recovery.

The recovered magnetite can be reused many times and testing has confirmed that there is no practical limit to the number of times it can be reused. However, some small quantity of the magnetite is lost in the process and must be replenished as necessary.

The magnetite provides several advantages. It provides solid particles to enhance chemical precipitation and coagulation. It adsorbs dissolved metals. It is heavy and provides good settling action so that most of the magnetic particles settle out of the flow before reaching the magnetic separator. This reduces the solids loading on the magnetic separator.

As noted, the use of magnetic seed material to remove non-magnetic material is not new. However, several improvements in known magnetic separation practices are made according to this invention, including, but not limited to: (1) the combination of magnetic seeding practices with a two-step chemical precipitation of heavy metals to make it possible to cost effectively remove the heavy metals down to very low levels, (2) combining gravity settling and magnetic separation in one treatment vessel, (3) recovering the magnetite by using forces to break the bond between the magnetite and the fine non-magnetic particles, and (4) certain specifics of the design of the components used and the process steps employed, as discussed in detail below.

The second precipitation step of the present invention preferably uses organic or inorganic sulfide chemicals. However, any metal precipitants (i.e., organic sulfides, inorganic sulfides, sodium borohydride, ferrous sulfate, ferrous chloride, etc.) that are more effective than hydroxide precipitants are suitable for the second precipitation step and are within the scope of the present invention. It is sometimes necessary to add a ferrous salt as a co-precipitant to break metal-chelate bonds to improve metal removal levels by co-precipitation effects. Any ferrous product will work but either ferrous sulfate or ferrous chloride is preferred; these are economical water treatment chemicals that add no extra toxicity to the water.

Magnetite is a naturally occurring magnetic material and is preferred in the practice of this present invention. However, any material showing good magnetic susceptibility can be used; ferrosilicon is one material that is suggested. The literature shows that magnetic materials can be formed either chemically from ferrous and ferric materials or electrically from iron electrodes. These sources of magnetic seed material are also acceptable and within the scope of the present invention. The inventor's experiments show that permanent magnets with a field strength of between 0.2 and 3.0 tesla effectively remove these magnetite/metal sulfide bonded particles. The preferred magnets are high strength "NdFeB" rare earth magnets, e.g., magnets comprised of neodymium, iron, and boron.

As far as known to the inventor, there is no prior art teaching magnetic seeding in combination with a hydroxide/sulfide two-step precipitation process, nor practicing magnetic separation and gravity settling in one treatment vessel.

Dissolved Air Flotation (DAF):

As a further alternative to, or in addition to, magnetic separation, enhanced flotation using micro bubbles can be employed in this present invention. These devices are effective in gently removing fine metal precipitates. Compressed air is dissolved in the wastewater; when the pressure is released, the air comes out of solution in the form of fine bubbles. These bubbles attach to the fine metal precipitates causing them to float. These particles are then skimmed off the surface of the water and disposed of There is no known prior art teaching the combination of DAF units with a hydroxide/sulfide two-step precipitation process as described in this patent application.

Vortex Separation:

Another alternative to magnetic separation in the practice of this present invention is the use of vortex separation. Vortex separators amount to centrifuges disposed in a tank, to perform separation of large particles using tangential flow and gravity forces. This process is enhanced according to this invention by using magnetite and an anionic flocculant to increase the weight and size of the precipitates to make them settle more rapidly. The clear water rises to the top of the vortex separator and the solids fall to the bottom.

This present invention is the first known proposal to use vortex separators to remove metal precipitates following a hydroxide precipitation step and the first use of magnetite as a ballast to promote rapid settling in a vortex separator.

Vortex separation is the preferred embodiment of using field separation technologies based on gravity because it does not cause breakup of the fragile metal precipitate floc. However, this present invention also includes other field separation technologies (i.e., hydrocycloning and centrifugation) using centrifugal forces.

Expanded Plastics Flotation:

In one embodiment, the invention accomplishes the efficient removal of fine contaminant particles from water by using enhanced flotation in combination with a two-step precipitation process for heavy metal removal or as a separate treatment method in a one step process to remove fine contaminant particles from water. A flocculating polymer is used to attach a buoyant material, in this case an expanded plastic, to the fine contaminant particles. In one embodiment of this invention, an anionic polymer is first mixed with the fine contaminant particles to be removed, and a second cationic polymer mixed with the buoyant material, so as to ensure attraction of the buoyant material to the fine contaminant particles to be removed. The combined buoyant material and fine contaminant particles then float to the surface of the water, where they can readily be removed. After one or more uses, the fine contaminant particles can be separated from the buoyant material, enabling reuse thereof.

A pilot-scale system was constructed with a 15-gallon mix tank and a variable speed mixer. A mixture of water containing 20 ppm metal sulfide particulates and an anionic flocculant flowed into the tank, which contained expanded polystyrene (EPS) granules of 0.025 inches mean size, which had been treated with a cationic polymer. The variable speed mixer was set at a moderate speed, so that the EPS was able to contact the metal sulfides and be bound thereto by the flocculating polymer; more violent mixing would be expected to prevent effective binding. The flocculant polymers attached the metal sulfides to the EPS and the flocculated mixture floated to the top of the tank, forming a floating mat. The use of a mixer can likely be avoided in a commercial realization of the invention, and the efficient contacting of the metal sulfides with the EPS be accomplished by natural mixing in-line. This was demonstrated in another pilot-scale test, where metal sulfide precipitates were first flocculated with an anionic polymer. Then they were mixed inline with EPS that had been treated with a cationic polymer. The treated water flowed by gravity into the tank at a rate of 10 gallons per minute and excess water, free of metal precipitates, was discharged from the bottom of the tank. The EPS formed a floating mat on the surface of the water. This removed any particles that had not attached inline to the EPS. This test demonstrated that the EPS could be attached inline to the metal sulfides by flocculating polymers and that the floating mat formed by the combined particles floated to form a secondary collector in a separator tank. The water that percolated through the floating mat of EPS and metal sulfides was clear and free of suspended particles. It was thus demonstrated that the metal precipitates that did not attach to the EPS in-line attached to the EPS in the floating mat. Agitation of the ESP was also helpful in flocculating the fine contaminant particles with the ESP.

As a final test to prove that the metal precipitates were being removed by molecular forces provided by the cationic polymer and not by in-depth filtration, the present inventor gently agitated the bed to see if the metal precipitates released from the EPS. The particles did not release from the EPS, showing that in-depth filtering was not a factor. The particles were being removed by molecular forces between the anionic and cationic polymers.

While not proven, experience leads us to theorize that first the negative-charged anionic polymer attracts the positively-charged metal precipitates and forms a floc that now has a negative charge. The positively-charged cationic polymer attaches to the EPS giving the EPS a positive charge. When the negatively-charged metal precipitate comes into contact with the positively-charged EPS, the opposite charges attract, causing the metal precipitates to bind to the EPS.

The flocculating polymer forms a bond between the EPS and the metal precipitate sufficient to withstand the forces of flotation and those encountered during removal of the flocculated materials from the water. When it is necessary to separate the metal precipitates from the EPS, high-shear mixing can be performed to break the particle bonds. After the bonds are broken, the liberated EPS can be separated from the metal precipitate by flotation, cleaned, and reused. Alternatively, the separation and cleaning process can include any process that can effectively separate the fine contaminant particles from the buoyant seed material, e.g., mechanical separation, pH or chemical treatment, heat, biological treatment, or ultrasonic treatment. The remaining fine contaminant particles are removed by gravity from the system and dewatered with appropriate dewatering equipment. The recovered EPS can be reused many times; testing has confirmed that there is no practical limit to the number of times it can be reused. However, some small quantity of the EPS is lost in the process and must be replenished as necessary.

The addition of buoyant material according to the invention to remove particulates from a water stream is effective when the particles are small and lightweight and are amenable to flotation. The invention is suitable for large-scale applications with high flow rates because few moving parts are involved, the storage vessels required need only be large enough to contain the water for a short period of time, and flow is by gravity. The process can also be performed inline and tanks are not necessary. This makes the process especially attractive for large-scale operations that have space and capital cost limitations.

There are a number of buoyant seed materials that can be used. Any material that exhibits strong positive buoyancy, will not become water-logged over time, and can be attached to fine contaminant particles by flocculating polymers can be used. The preferred embodiment of the invention is to use an expanded closed-cell plastic material such as EPS. This material is available as a waste product, has strong positive buoyancy and is chemically inert in most circumstances. Suitable waste material comes in all sizes and can be ground up into small granules without severely affecting its closed cell structure and its buoyancy. EPS waste material also comes in a variety of densities. Different types of materials were tested with no apparent difference in performance. However, it is preferred that the materials used have high buoyancy. The EPS granules are also strong and can withstand repeated cleanings. If EPS is not chemically compatible with the wastewater, other expanded plastics such as expanded polyethylene and expanded polypropylene can be substituted.

Similarly, any of a wide range of well-known flocculating polymers can be used. Those used in the tests reported herein, which appear to be fully suitable, are available from Stockhausen under product numbers K111L and A3040L.

BRIEF DESCRIPTION OF THE DRAWINGS

The present invention will be better understood if reference is made to the accompanying drawings, in which.

DETAILED DESCRIPTION OF THE INVENTION

Figure 1:
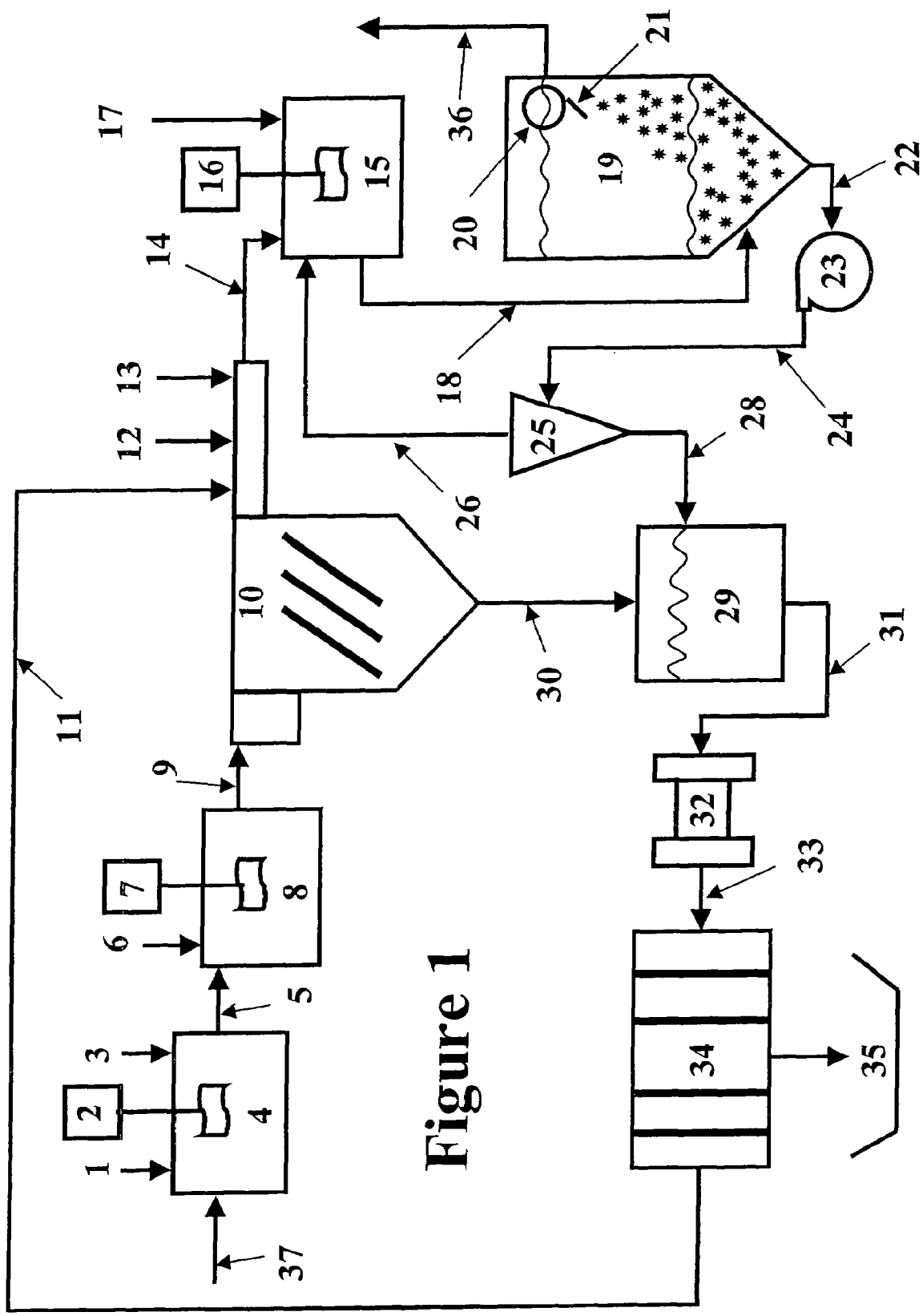
FIG. 1 shows a schematic diagram of a system for practicing the method of the present invention, using magnetic separation.

The magnetic separation and the expanded plastics flotation embodiments of the invention were selected for data collection to demonstrate the effectiveness of a two-stage precipitation process with a selected "field separation" process according to the invention. Equipment limitations prevented collecting data for the DAF and vortex separation embodiments, but it is known in the art that these technologies can effectively remove fine particles.

The first step of the method of the invention as employed to remove heavy metals from a water stream is hydroxide precipitation. Over a number of laboratory tests from all types of water, the first step precipitation resulted in removal efficiencies of 95.7-98.5% with an average removal efficiency of 96.8%. This removal level lowered the dosage requirements for advanced metal precipitants by 89%. The main goal of this testing was to prove that lesser quantities of treatment chemicals would be used, while better metal removal levels would be attained following the practices of the present invention.

Chelated copper wastewater samples, taken from the printed circuit board industry, were selected to demonstrate the effectiveness of the present invention. Five samples were separately tested, first using the conventional one-step sulfide process, and then using the two-step process of the present invention. The results of the tests, showing the copper content of the samples in ppm before and after treatment, are as follows:

One- and Two-step precipitation data

|  | Original Copper (ppm) | Sulfide Precipitant (ppm) | Ferrous Chloride (ppm) | 1st Step Copper (ppm) | 2nd Step Copper (ppm) |
|---|---|---|---|---|---|
| Sample 1 |  |  |  |  |  |
| One-step process | 16.4 | 100 | 100 | 0.12 | N/A |
| Two-step process | 16.4 | 10 | 10 | 0.70 | 0.01 |
| Sample 2 |  |  |  |  |  |
| One-step process | 69.3 | 250 | 360 | 0.05 | N/A |
| Two-step process | 69.3 | 50 | 50 | 2.87 | 0.01 |
| Sample 3 |  |  |  |  |  |
| One-step process | 25.2 | 150 | 200 | 0.47 | N/A |
| Two-step process | 25.2 | 10 | 10 | 0.73 | 0.06 |
| Sample 4 |  |  |  |  |  |
| One-step process | 46.4 | 150 | 300 | 0.31 | N/A |
| Two-step process | 46.4 | 10 | 20 | 0.70 | 0.09 |
| Sample 5 |  |  |  |  |  |
| One-step process | 21.9 | 100 | 200 | 1.01 | N/A |
| Two-step process | 21.0 | 25 | 50 | 4.41 | 0.19 |

The above data shows that although the precipitants were added in lesser quantities in practice of the two-step process of the present invention, lower copper concentrations in the water sample were nonetheless achieved. Thus, better water quality as well as substantial cost savings result from use of the present invention. The metal precipitants added for the second step of the precipitation process react with dissolved metals that did not precipitate in the first step. The above data shows how effective the two-step precipitation process (hydroxide and sulfide) is over the one-step precipitation process (sulfide only).

The metal precipitant used for the second step precipitation for the tests was an inorganic sulfide and a small amount of a ferrous salt, e.g., ferrous sulfate, was added to lower the metals in the treated water. The sulfide precipitates had a characteristically small particle. They were too fine to easily settle by gravity and required the use of an organic flocculant.

Conventional separation methods can be used, as discussed in detail below, but a preferred mode of practice of the invention employs a magnetic separator and a magnetic seed material in the separation step.

Magnetic seeding is a technology for the enhanced removal of magnetic and non-magnetic particulates from liquids. It involves the addition of a small amount of magnetic seed particles, preferably magnetite (a naturally occurring iron oxide); however, other materials showing magnetic susceptibility, such as iron powder, are suitable and are within the scope of the present invention. These magnetic seed particles are caused to attach to non-magnetic metal sulfides by the use of a flocculating polymer (preferably an anionic polymer). Then a magnetic separator removes the flocculated particles that have high magnetic susceptibility derived from the magnetic seed material. This magnetic seeding technique is applicable to a wide range of liquid wastes including contaminated groundwater, process waters, municipal wastewater, and industrial wastewater.

The effectiveness of magnetic seeding with magnetite is determined by measuring the level of suspended particles (ppm) before treatment and after treatment with a magnetic separator. The magnetic separator can comprise any of a wide variety of devices producing a magnetic field effective to apply a magnetic force to water-borne particles exhibiting magnetic properties; in the preferred embodiment (again, see FIGS. 5-10, below) permanent magnets are used for reasons of cost with no interruption to operation for cleaning.

Tests were performed to determine the effectiveness of the inventive process to remove fine particles from water. The present invention was specifically tested against gravity clarification without the use of magnetite.

The following data shows how effective the use of a magnetic seed and a magnetic separator according to the invention is on a variety of water samples, as compared to a simple gravity-settling clarification process. Anionic flocculants (Stockhausen A3040L) were added to all samples. Total suspended solids (TSS) determination using Hach DR 2010 equipment was the measure of how effectively fine particles were removed. The industrial wastewaters and potable water were first treated with metal precipitants that added to the amount of fine particles to be removed. No metal precipitants were used with the municipal and storm water samples because these waters already contained a large quantity of fine particles and ordinarily do not require metal removal.

|  | Clarification | | Magnetic Separator | |
|---|---|---|---|---|
|  | Initial TSS | Final TSS | Initial TSS | Final TSS |
| Potable water | 8 | 3 | 8 | 4 |
| Storm water | 550 | 19 | 550 | 8 |
| Municipal wastewater | 154 | 10 | 154 | 4 |
| Industrial wastewater 1 | 67 | 17 | 67 | 13 |
| Industrial wastewater 2 | 220 | 9 | 220 | 6 |
| Industrial wastewater 3 | 160 | 21 | 160 | 1 |

All final samples were allowed to settle for one minute before TSS readings were taken. The magnetic separator samples were then treated with a bar magnet to remove any remaining TSS.

As is apparent from this data, addition of magnetite and providing a magnetic separation step according to the present invention improved the effectiveness of the separation with respect to each sample (except for the potable water sample), and in some cases the improvement was well over 100%. In particular, note that the method of the invention was effective in removing particulates (essentially dirt) from storm water, that is, without any preceding treatment step.

The present inventor then determined whether recirculating the collected magnetic particles had any adverse effects on the collection of new magnetic particles. The precipitate collected from each previous laboratory sample was added to each subsequent sample. This recirculation of solids improved the flocculation of the tested sample. The water was visibly clearer and the dissolved metal levels were lower.

Although not intending to be bound thereby, the inventor theorizes that this recirculation of solids lowers the level of dissolved metals in the wastewater because the reaction has additional time to go to completion and the recirculated metal sulfide precipitates absorb additional dissolved metals. The improved flocculation is a result of having more solids present to increase the number of collisions between particles, which improves flocculation.

Tests were performed to determine the effectiveness of enhanced flotation using expanded plastics to remove fine particles from water. The process of the present invention was implemented essentially as above, and was also specifically tested against gravity clarification.

The following data compares the effectiveness of using expanded plastics according to the invention to remove fine contaminant particles from a water stream to a simple gravity-settling clarification process. These tests were performed on a variety of different samples of water, as listed below. The total suspended solids (TSS) in each sample were measured using Hach DR 2010 equipment to determine how effectively fine particles were removed. The industrial wastewaters and potable water were first treated with sulfide metal precipitants that formed particulates, thus adding to the amount of fine particles to be removed. No metal precipitants were added to the municipal and storm waters because these waters already contained a large quantity of fine particles and ordinarily do not require metal removal.

The expanded plastics (in this case EPS), was added to each sample in the amount of 1 percent by weight. For comparison purposes, ferrous sulfide was added at a concentration of approximately 50 ppm. The flocculant used comprised a cationic polymer added to the EPS at a dose of 20 ppm and an anionic polymer added to the water stream containing the ferrous sulfide particulates at a dose of 10 ppm.

|  | Clarification | | Expanded Polystyrene | |
| --- | --- | --- | --- | --- |
|  | Initial TSS | Final TSS | Initial TSS | Final TSS |
| Potable water | 8 | 3 | 8 | 5 |
| Storm water | 550 | 19 | 550 | 12 |
| Municipal wastewater | 154 | 10 | 154 | 8 |
| Industrial wastewater 1 | 67 | 17 | 67 | 12 |
| Industrial wastewater 2 | 220 | 9 | 220 | 7 |
| Industrial wastewater 3 | 160 | 21 | 160 | 14 |

The clarifier samples were allowed to settle for one minute and the EPS samples were allowed to float for one minute before TSS readings were taken.

As is apparent from this data, seeding the water with expanded plastics and flocculating polymers according to the invention improved the effectiveness of the separation with respect to each sample; in some cases, the improvement was well over 100%.

It will be apparent to those skilled in the art that allowing the samples to settle longer in the clarifying tanks would have led to improved results. However, as noted, it is generally the case that some fraction of the particulates are not removed in the clarifying process; accordingly, deliberately enhanced flotation and removal according to the invention can yield substantially improved results regardless of the amount of settling time provided in a clarifying tank.

While improvement in clarification is important, it is also important to be able to process water quickly. The biggest drawback to clarification by settling is that it takes large-capacity equipment to be able to process reasonable quantities of water, as the required residence time in a clarifier may range from 30 minutes to several hours. If a clarifier is being used, it is important to maintain a slow and non-turbulent flow to allow the flocculated particles to settle. Contrary to this, the present invention allows rapid flow because the buoyant flocculate will float very rapidly and completely. The residence time to remove the fine particles with this invention is in the order of one minute as compared to the 30-minute minimum required for clarification by gravity settling without added ballast.

Another test was performed to evaluate the effectiveness of separating the EPS particles that have been bound in-line to the metal precipitates from the treated water. This was easily accomplished by discharging the flow into a separation tank. The EPS floated on the surface of the water while the clear treated water was withdrawn from the bottom of the tank. The EPS floating on the surface of the water in the tank formed a mat which removed any metal precipitates that had not been bound to the EPS in-line.

In conclusion, the laboratory tests discussed above show that an expanded plastic material such as EPS can be effectively attached to fine contaminant particles with the use of flocculating polymers, preferably anionic and cationic polymers, one flocculated with the metal precipitates and the other bound to the EPS. The combined particles floated on the water's surface and were easily removed. The resulting water was clear of suspended solids to the naked eye, and resulted in low suspended solids as measured by Hach equipment. Mixing under high shear conditions easily separated the EPS and particulates bound thereto, allowing the EPS to be reused over and over again. The shear mixing to separate the EPS from the fine particles did not noticeably affect the buoyancy of the EPS.

Tests were performed to prove that the metal precipitates were attached to the EPS in the floating mat by molecular forces rather than by in-depth filtration, that is, by molecular forces rather than by filtration in a filter such as a sand filter, where the particles are trapped in the interstitial spaces between the sand particles, but are not attached to the sand, so that if the bed is disturbed the particles will come free. Three samples were prepared for testing. One sample constituted the blank and contained EPS treated with a cationic polymer, one sample contained EPS treated with an anionic polymer, and the third sample contained EPS treated with a cationic polymer. Then a sample of water containing a metal hydroxide flocculated with an anionic polymer was passed through the sample containing the EPS with the anionic polymer, and an equal quantity of water containing a metal hydroxide flocculated with an anionic polymer was passed through the sample containing the EPS treated with the cationic polymer. The water that percolated through the EPS floating mats were tested for Total Suspended Solids to determine the EPS's ability to remove the metal precipitates. Then the floating beds of EPS were gently agitated to see if the metal precipitates would be released back into the water. The following data was collected:

|  |  | TSS | TSS (after bed agitation) |
| --- | --- | --- | --- |
| Blank | (EPS treated with a cationic polymer) | 13 | 13 |
| Sample 1 | (EPS treated with an anionic polymer plus metal hydroxides) | 191 | >3800 |
| Sample 2 | (EPS treated with a cationic polymer plus metal hydroxides) | 10 | 8 |

In summary, the EPS treated with a cationic polymer was able to collect all the metal precipitate with no breakthrough (Sample 2). The TSS reading was actually less after the metal hydroxides were added. The Sample 1 containing the anionic polymer had breakthrough of the metal hydroxides. After agitating the beds, almost all of the metal hydroxides went back into the water for the sample containing the anionic polymer. However, the sample containing the cationic polymer (Sample 2) still retained all the metal hydroxides even after the bed was agitated.

FIGS. 1-4, described in the following, schematically illustrate various process arrangements that may be used to implement the present invention. Again, the preferred mode employs magnetic separation techniques and expanded plastics flotation, but the other techniques mentioned are within the scope of the invention, and may be preferred in various circumstances.

Magnetic Separation: FIG. 1

In this implementation of the invention, water first enters through pipeline (37) into a pH adjustment tank (4) including a high speed mixer (2), in which the pH is adjusted with either acid (1) or caustic (3) to the optimum pH for metal hydroxides to form. In most cases the acid is sulfuric acid, and the caustic is usually sodium hydroxide or lime. For mixed metal solutions, the pH that removes the most metals is selected. The water then flows through a pipeline (5) into a flocculation tank (8) where an anionic polymer (6) is added to flocculate the hydroxide precipitate. A slow speed mixer (7) aids the formation of floc. pH adjustment and hydroxide formation thus comprise a first precipitation step. The water and metal hydroxide precipitates then flow through a pipeline (9) into a clarifier (10) where the metal hydroxide precipitates settle out of the wastewater and flow through a pipeline (30) and into a sludge settling tank (29). From here the slurry flows through pipeline (31) and is pumped (32) through a pipeline (33) to a filter press (34) for dewatering. The dewatered sludge is discharged to a hopper (35) and disposed of or recycled. The filtrate from the filter press (34) flows back through pipeline (11) and is treated for metal removal.

A metal precipitant is added at (12), at the discharge from the clarifier (10) The metal precipitant can be any of a variety of materials. The most common are sulfides, either organic or inorganic, but in a few cases, other precipitants like borohydride can be added; the criterion is simply that an insoluble compound is formed, thus causing the second precipitation step to occur. A ferrous compound may be added, as a metal precipitant or in order to cause other precipitants to be more effective, by breaking chelate bonds.

The metal precipitates then flow through a pipeline (14) to a flocculating tank (15). Here an anionic flocculating polymer (17) is added to flocculate the metal precipitate with the recycled magnetic seed material coming from pipeline (26). It is preferred to add the metal precipitant first, to produce a completed reaction with the heavy metals, and then to add the polymer flocculant. This gives the precipitated particles the maximum time to attach to the magnetite with the aid of the polymer flocculant. A slow speed mixer (16) aids in the flocculation process. The flocculate then flows through pipeline (18) into a separator tank (19). In this embodiment, separation is accomplished by a combination of gravity and magnetic separation. More specifically, a large fraction, on the order of 90% (depending on the area of the settling tank and the average residence time) of the flocculated particles, again comprising the precipitated metals to be removed having been bonded by the flocculating polymer to the magnetite, forms a heavy precipitate that settles to the bottom of the separator tank as a dense sludge by gravity; the remaining fraction, principally lighter fine particles, is swept into the upper region of the separator tank by the water flow.

Figure 5:
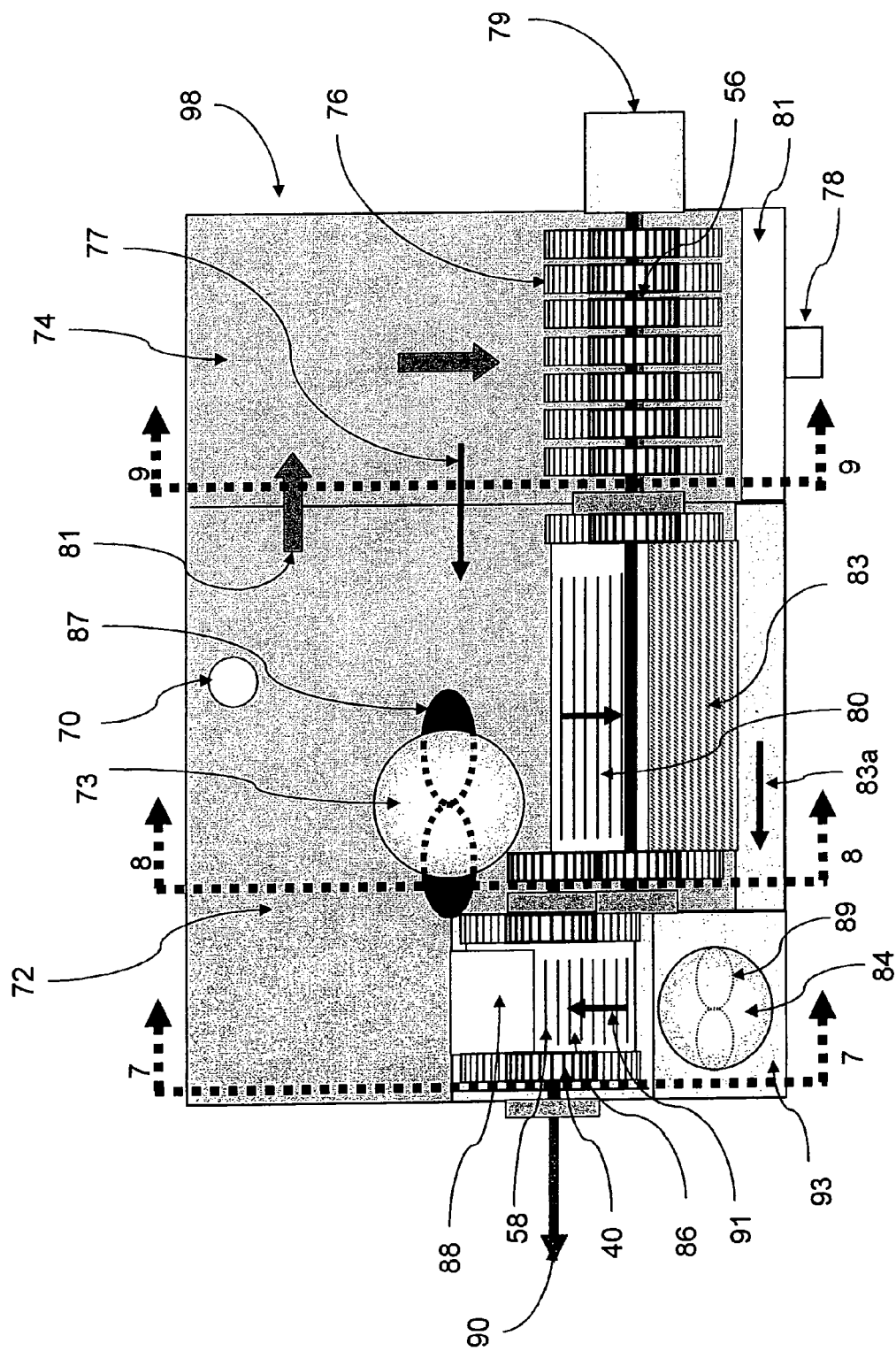
FIG. 5 shows a schematic diagram in plan view of an improved magnetic separation unit provided according to a preferred embodiment of the invention.
Figure 6:
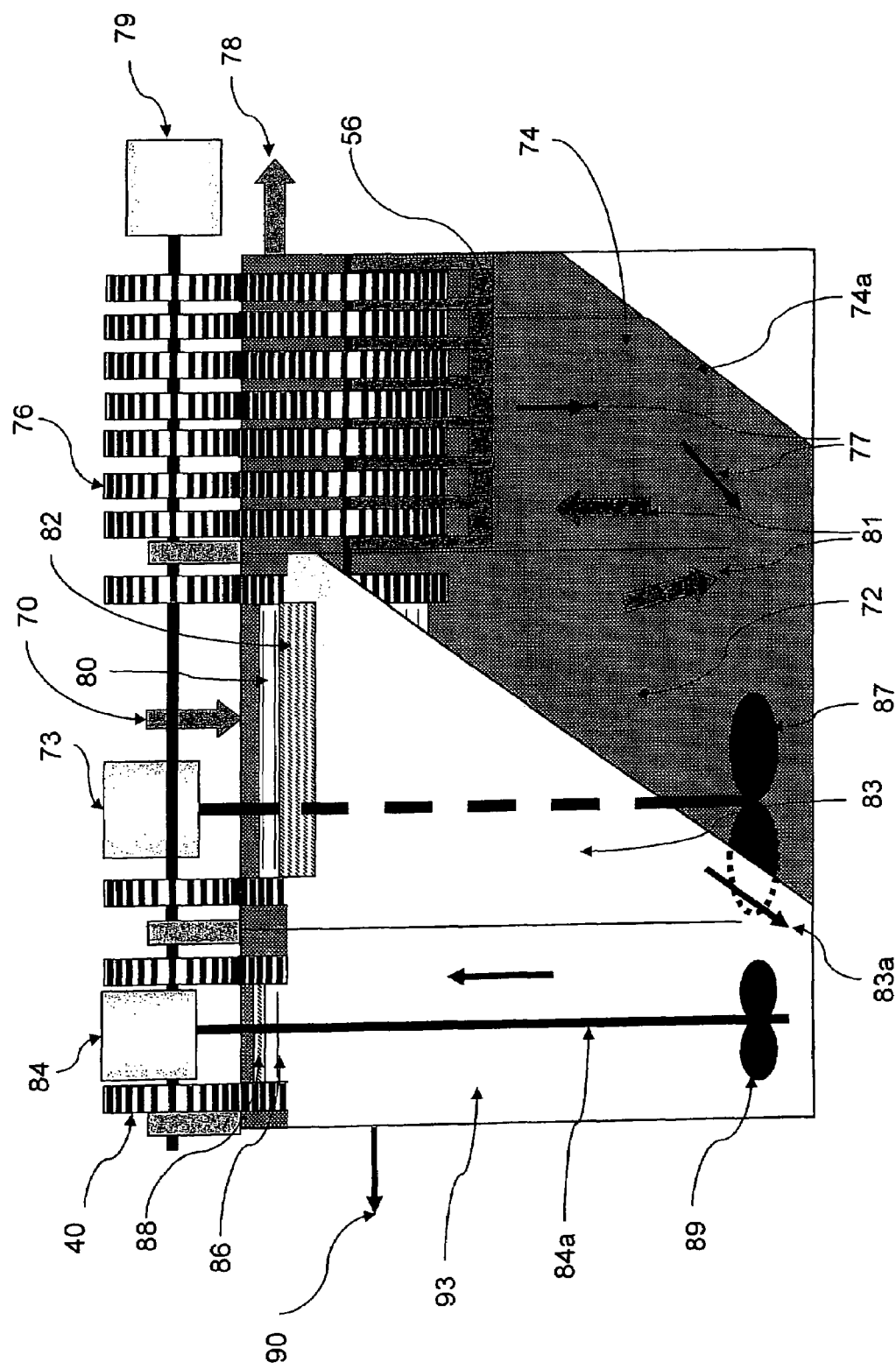
FIG. 6 shows an elevation of the unit of FIG. 5.

These particles are captured by a magnetic separator (20) to prevent their discharge through pipeline (36). A scraper (21) is installed in the separator tank (19) for cleaning separator (20) when it becomes heavily laden with magnetic particles. FIGS. 5 and 6, discussed below, further detail these components. The particles scraped from the magnetic separator (20) tend to clump with one another because of a slight magnetic charge, forming heavier particles, and then settle to the bottom of the separator tank (19) and are discharged through pipeline (22). A pump (23) then pumps the sludge to a magnetic seed cleaning tank (25). Here the magnetic seed material is separated from the metal precipitates. The magnetic seed material flows through pipeline (26) and is reused in the process. The metal precipitates flow through pipeline (28) into the sludge settling tank (29) for subsequent dewatering and disposal. Substantial improvements on the FIG. 1 apparatus are discussed below in connection with FIGS. 5-10.

Figure 2:
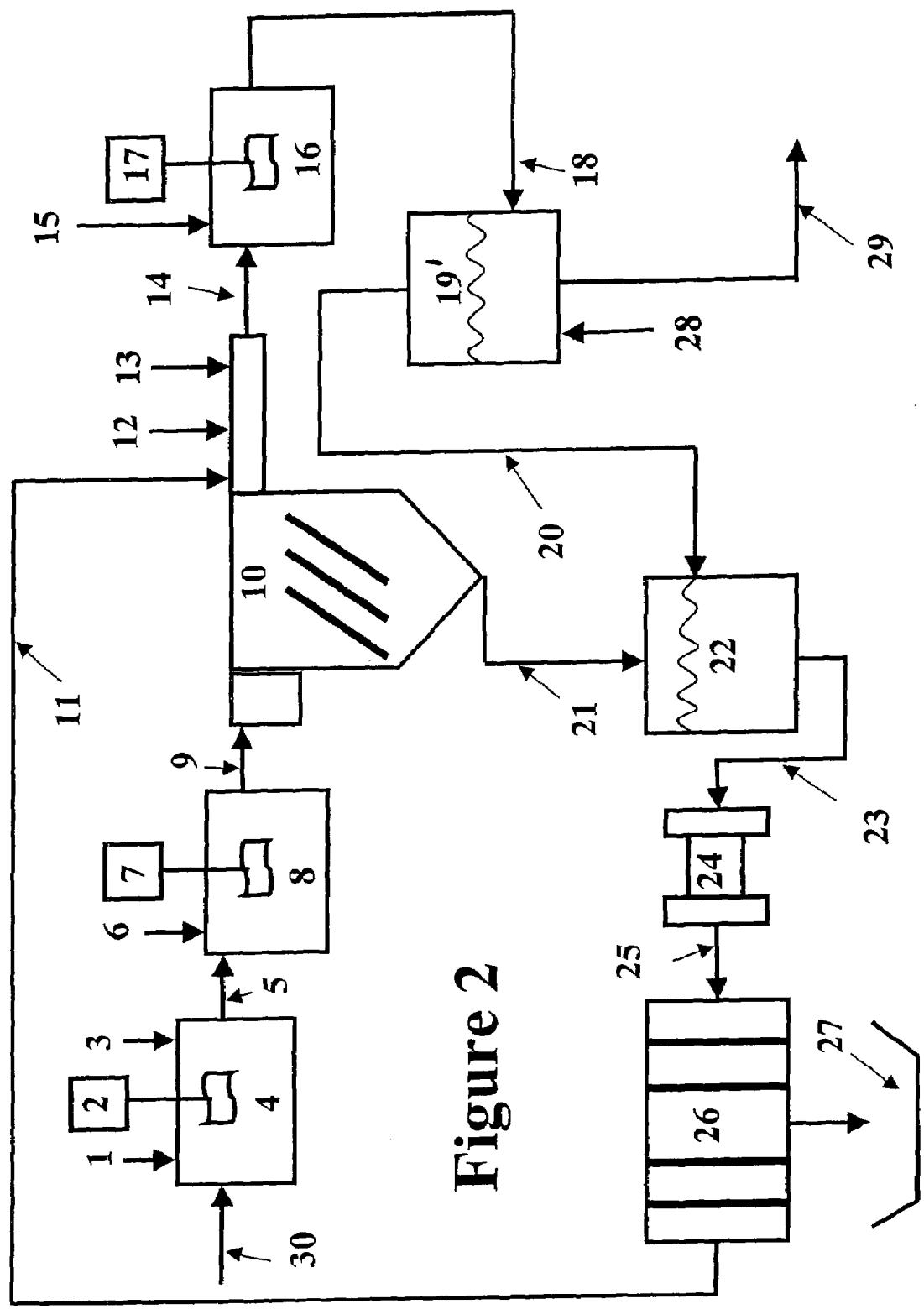
FIG. 2 shows a schematic diagram of a system for practicing the method of the present invention, using dissolved air flotation.

Dissolved Air Flotation: FIG. 2

In this implementation of the invention, dissolved air flotation (DAF) techniques are used in either or both precipitation step(s); in the example, DAF separation replaces the magnetic separation used in the second precipitation stage of the process of FIG. 1. DAF techniques are preferred where the materials to be removed are light, e.g., oil or grease, or low-density particulates. Water enters through pipeline (30) into a pH adjustment tank (4) in which, impelled by a high-speed mixer (2), the pH is adjusted with either acid (1) or caustic (3) to the optimum pH for metal hydroxides to form. For mixed metal solutions, the pH that removes the most metals is selected. The water then flows through a pipeline (5) into a flocculation tank (8) where a polymer (preferably anionic) (6) is added to flocculate the hydroxide precipitate. A slow-speed mixer (7) aids the formation of floc. The water and metal hydroxide precipitates then flow through a pipeline (9) into a clarifier (10) where metal hydroxide precipitates settle out of the wastewater and flow through a pipeline (21) into a sludge settling tank (22). From here the slurry, that is, the hydroxide particles in a slurry with water, flows through a pipeline (23) and is pumped by a pump (24) through a pipeline (25) into a filter press (26) for dewatering. The dewatered sludge is discharged to a hopper (28) and disposed of or recycled. The filtrate from the filter press flows through a pipeline (11) back to the discharge point of the clarifier for metal removal. At the discharge from the clarifier (10), metal precipitant (12) and ferrous material (13) are added. The flocculated particles flow through a pipeline (14) and into a flocculation tank (16). Here a polymer (preferably an anionic polymer) is added at point (15) and the solution allowed to mix with the aid of a slow-speed mixer (17). The flocculated particles then flow through a pipeline (18) into separation tank (19), in this embodiment configured as a dissolved air flotation (DAF) device. Air is injected at point (28), which attaches to the flocculated particles causing them to rise to the top of the separation tank (19), as a froth containing the "sludge" to be removed. The sludge-containing froth then flows through pipeline (20) into the sludge settling tank (22) and clean water from the separation tank (19) flows out the bottom and discharged through pipeline (29). As above, the sludge collected in the sludge settling tank (22) flows through pipeline (23) and is pumped (24) through pipeline (25) and into a filter press (26) for dewatering. The dewatered sludge is discharged into a collection hopper (27) and disposed of, while the filtrate flows through pipeline (11) into the discharge from the clarifier (10) for metal removal.

Figure 3:
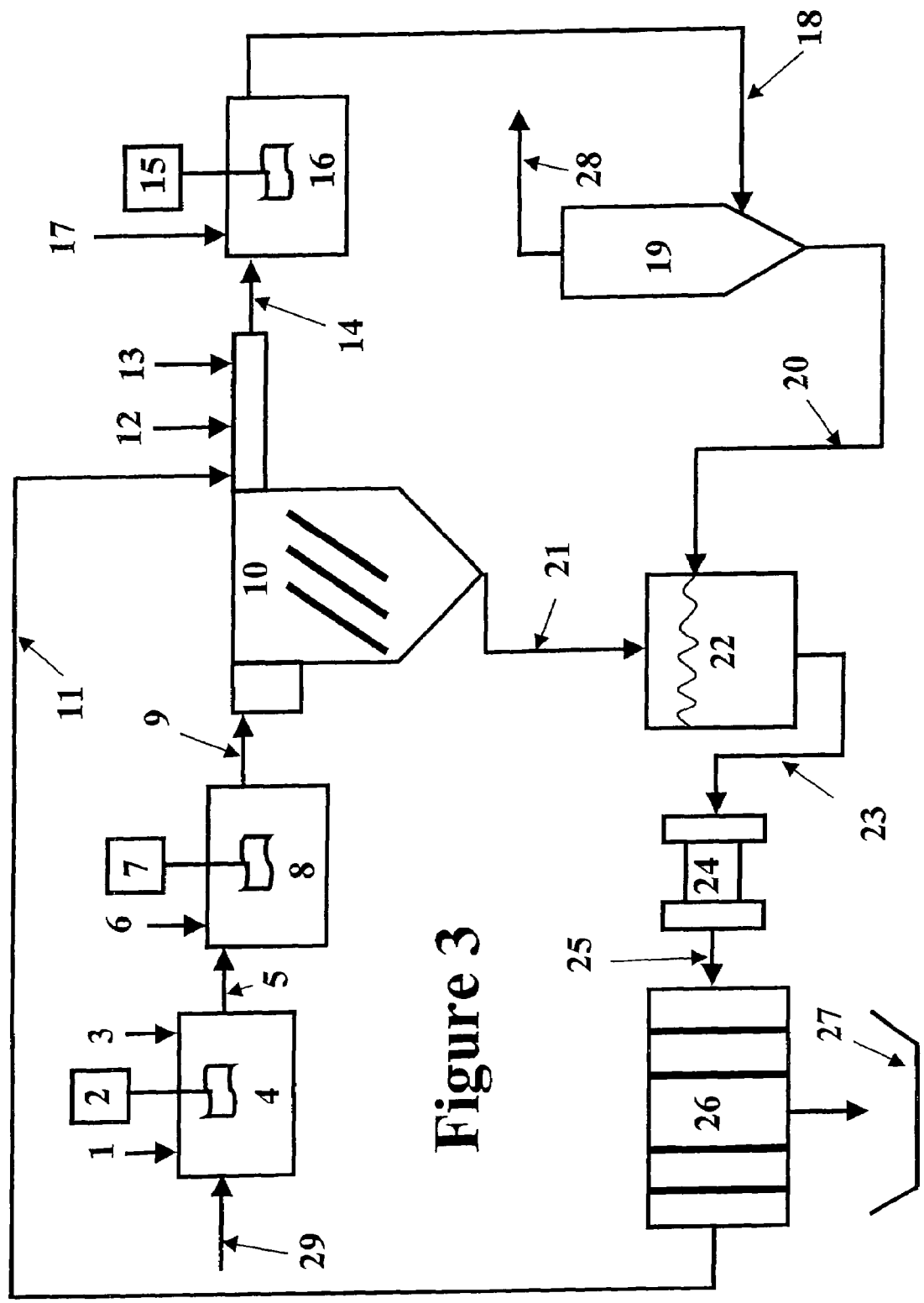
FIG. 3 shows a schematic diagram of a system for practicing the method of the present invention, using vortex separation.

Vortex Separation: FIG. 3

In this implementation of the invention, vortex separation is employed instead of magnetic separation in a two-step precipitation process. Again, water first enters through pipeline (29) and into a pH adjustment tank (4) in which the pH is adjusted with either acid (1) or caustic (3) to the optimum pH for metal hydroxides to form; a mixer (2) may be provided to ensure proper mixing. For mixed metal solutions, the pH that removes the most metals is selected. The water then flows through a pipeline (5) into a flocculation tank (8) where a polymer (6) (preferably anionic) is added to flocculate the hydroxide precipitate. A slow speed mixer (7) aids the formation of floc. The water and metal hydroxide precipitates then flow through a pipeline (9) to a clarifier (10) where metal hydroxide precipitates settle out of the wastewater and flow through a pipeline (21) into a sludge settling tank (22). From here the slurry flows through pipeline (23) and is pumped (24) through a pipeline (25) to a filter press (26) for dewatering. The dewatered sludge is discharged to a hopper (27) and disposed of or recycled. The filtrate flows through pipeline (11) from the filter press back to the discharge point of the clarifier (10) for metal removal. At the discharge from the clarifier (10), metal precipitant (12), and ferrous material (13) are added to precipitate any residual metals. The metal precipitates flow through a pipeline (14) and into a flocculation tank (16). Here a polymer (17) (preferably an anionic polymer) is added and the solution allowed to mix with the aid of a slow-speed mixer (15) to increase the floc size. The flocculation formed then flows through a pipeline (18) into separation tank (19), in this case comprising a vortex separator. The vortex separator is nothing more than a vertical cylindrical tank (19), with the water entry is arranged so that water enters tangentially and swirls up to the top. The heavier particles congregate in the center of the tank, settle to the bottom under the influence of gravity, and can readily be withdrawn. The clean water rises to the top of the separation tank (19) and is discharged through pipeline (28) and discharged, while the heavy particles settle to the bottom of the tank (19). The sludge from the bottom of the tank (19) then flows through pipeline (20) into the sludge settling tank (22). Here the precipitates settle to the bottom and are discharged through a pipeline (23) and are pumped (24) through pipeline (25) into a filter press (26) for dewatering. The dewatered sludge is discharged to a hopper (27) and disposed or recycled. Magnetite can be used in the process to promote rapid settling in the separation tank (19). When cost justified, the magnetite can be recycled by shearing the bond between the metal sulfides and magnetite with high-speed agitation and returning the magnetite back to the flocculation tank (16).

Figure 4:
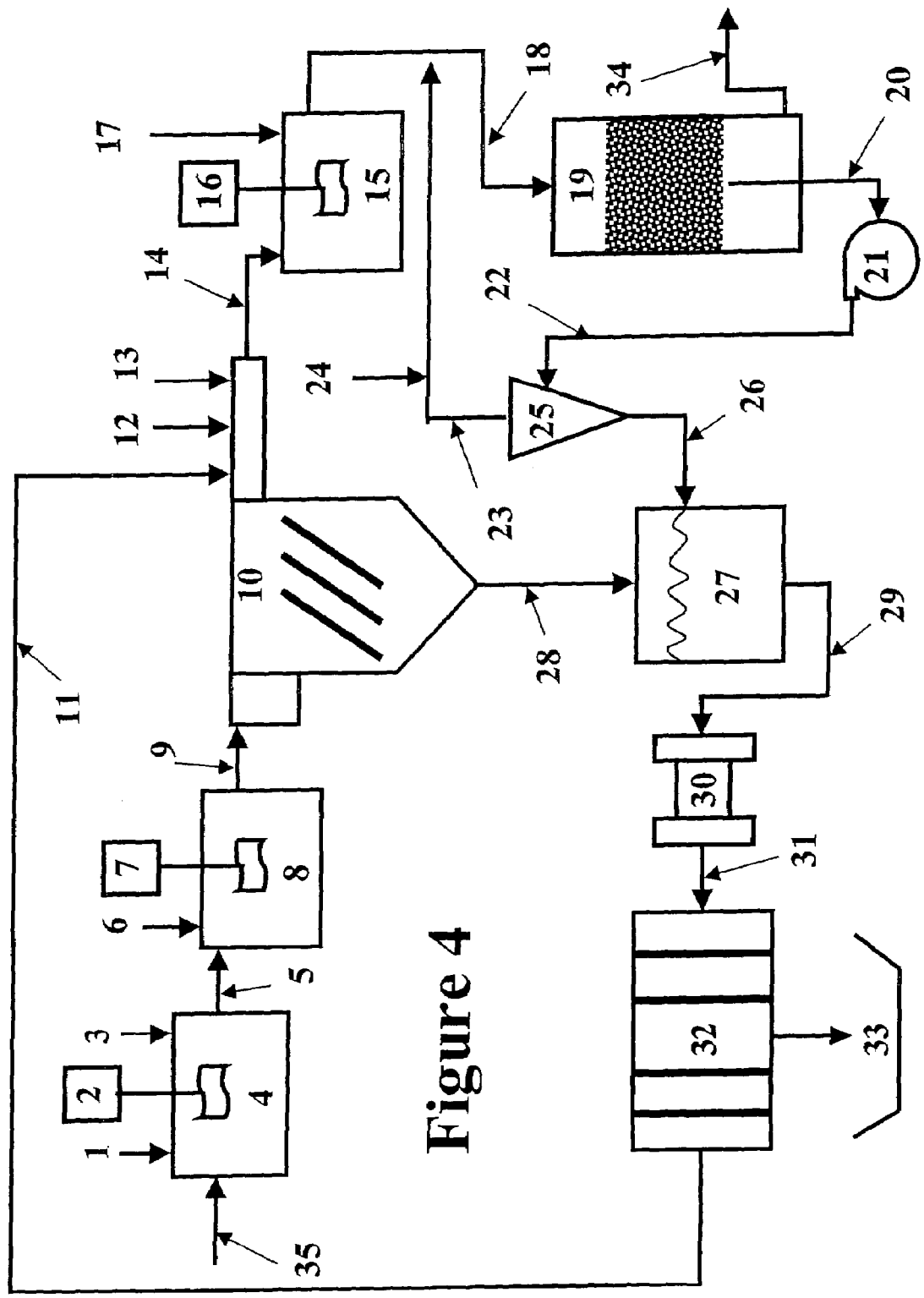
FIG. 4 shows a schematic diagram of a system for practicing the method of the present invention, using expanded plastics flotation.

Expanded Plastics Flotation: FIG. 4

In this embodiment, a novel expanded plastic flotation technique is used to separate the precipitated particles or other fine contaminant particles from the water stream. Again, water first enters through pipeline (35) into a pH adjustment tank (4) including a high speed mixer (2), in which the pH is adjusted with either acid (1) or caustic (3) to the optimum pH for metal hydroxides to form. For mixed metal solutions, the pH that removes the most metals is selected. The water then flows through a pipeline (5) into a flocculation tank (8) where an anionic polymer (6) is added to flocculate the hydroxide precipitate. A slow speed mixer (7) aids the formation of floc. The water and metal hydroxide precipitates then flow through a pipeline (9) into a clarifier (10) where metal hydroxide precipitates settle out of the wastewater and flow through a pipeline (28) and into a sludge settling tank (27). From here the slurry flows through pipeline (29) and is pumped (30) through a pipeline (31) to a filter press (32) for dewatering. The dewatered sludge is discharged to a hopper (33) and disposed of or recycled. The filtrate from the filter press (32) flows back through pipeline (11) and is treated for metal removal. At the discharge from the clarifier (10), metal precipitant (12) and, if desired, a ferrous compound (13) are added. The metal precipitate particles then flows through a pipeline (14) to a flocculating tank (15). Here an anionic flocculating polymer (17) is added to flocculate the metal precipitate. A slow speed mixer (16) aids in the flocculation process. The flocculate then flows through pipeline (18) into a separator tank (19). In this embodiment of the invention, the separator tank (19) contains a floating bed of granulated expanded polystyrene (EPS). The EPS has a positive charge from the addition of a cationic polymer at point (24). The flocculated metal precipitates from the flocculation tank (15) have a negative charge from the addition of an anionic polymer at point (17). Accordingly, when the metal precipitate comes into contact with the EPS, their opposite charges attract, causing them to stick together; the buoyancy of the expanded plastic material causes the agglomerated particles to float to the top of the liquid in tank (19). Clean water is discharged through pipeline (34), near the bottom of tank (19). The dirty EPS is withdrawn by way of a pipeline (20) located in the separation tank (19) with its inlet just below the floating EPS and is pumped by pump (21) through a pipeline (22) to a cleaning tank (25). The action of the pump (21) causes the metal precipitates to be sheared away from the EPS. The cleaned EPS goes back into the process through pipeline (23) to be used over again and the metal precipitate sludge flowing through pipeline (26) goes into the sludge settling tank (27) for eventual dewatering and disposal. The same process can be used to separate out particulates from a water stream, e.g., silt from storm runoff; again, a flocculant polymer can be used to attach an expanded plastic material to the particulates, which are then removed by flotation, as above.

Figure 7:
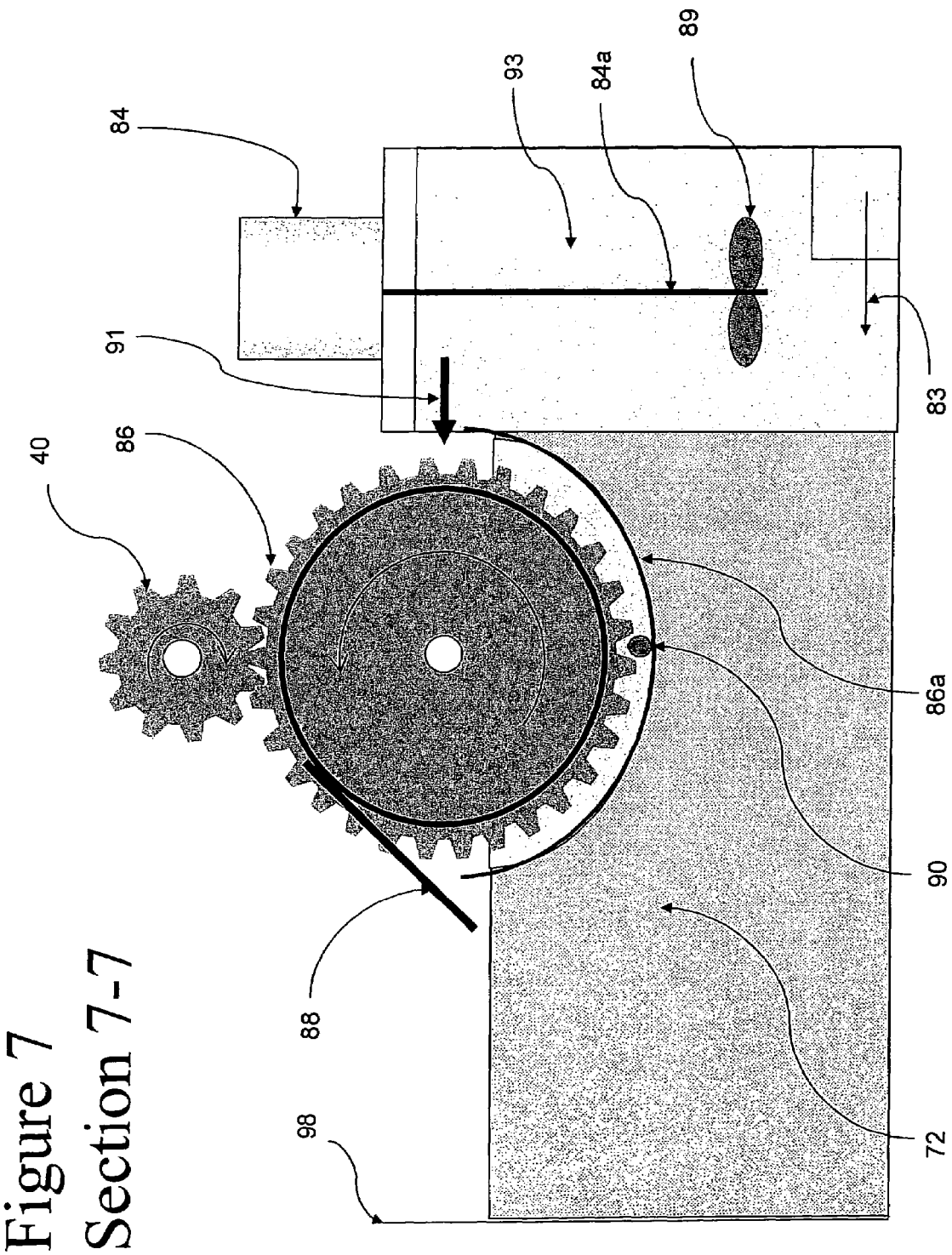
FIGS. 7-9 are cross-sections taken along lines 7-7, 8-8, and 9-9, respectively, of FIG. 5.
Figure 8:
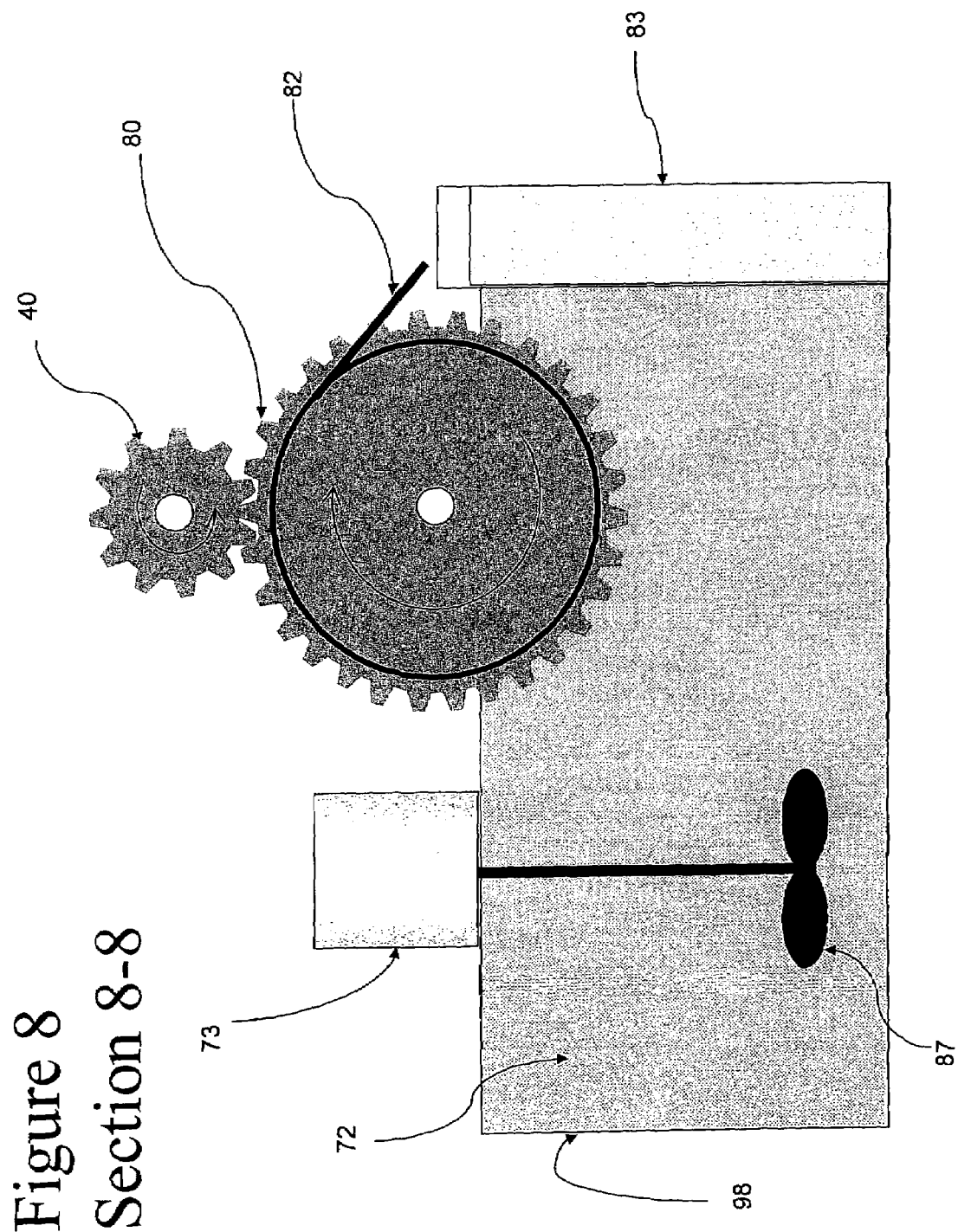
Figure 9:
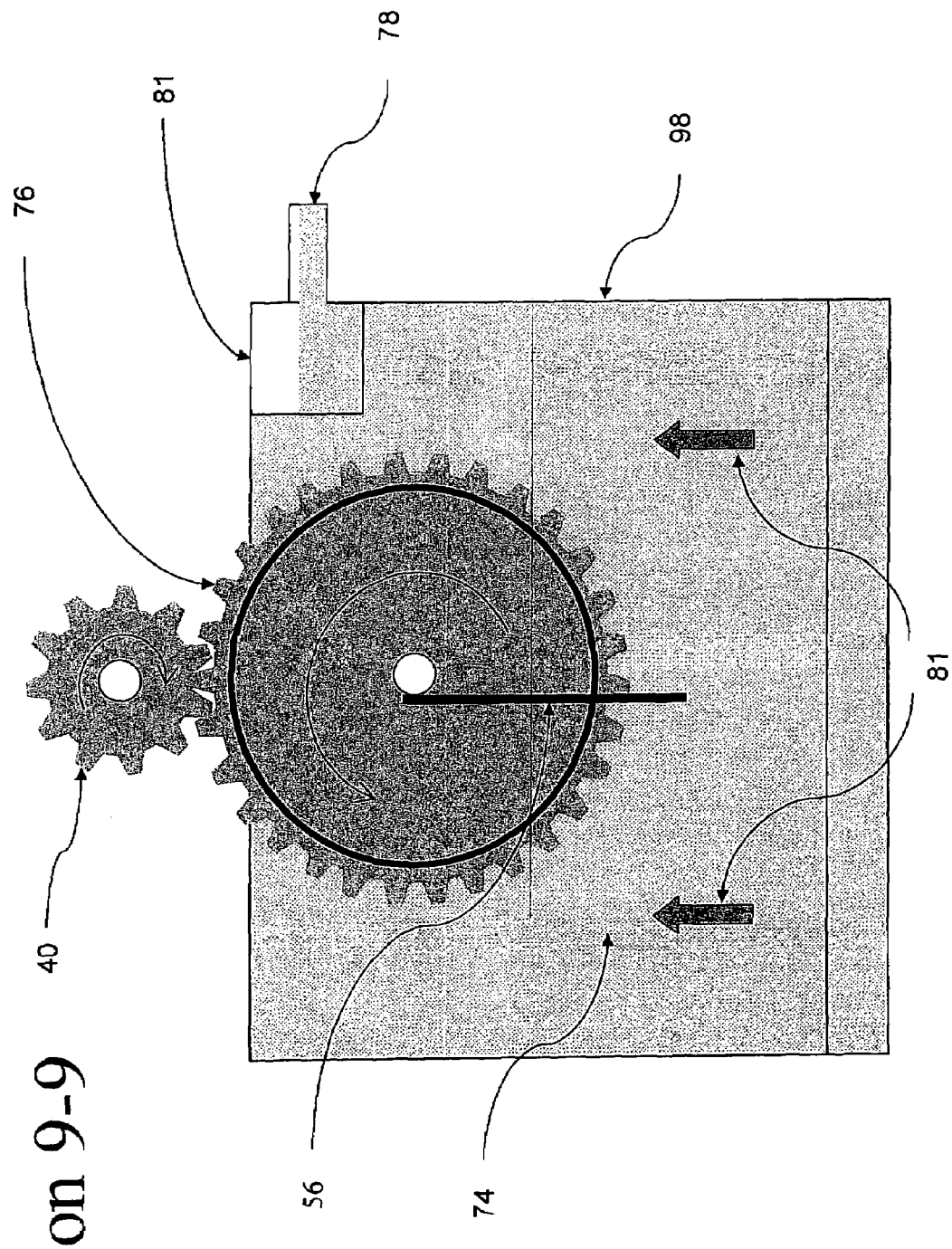
Figure 10:
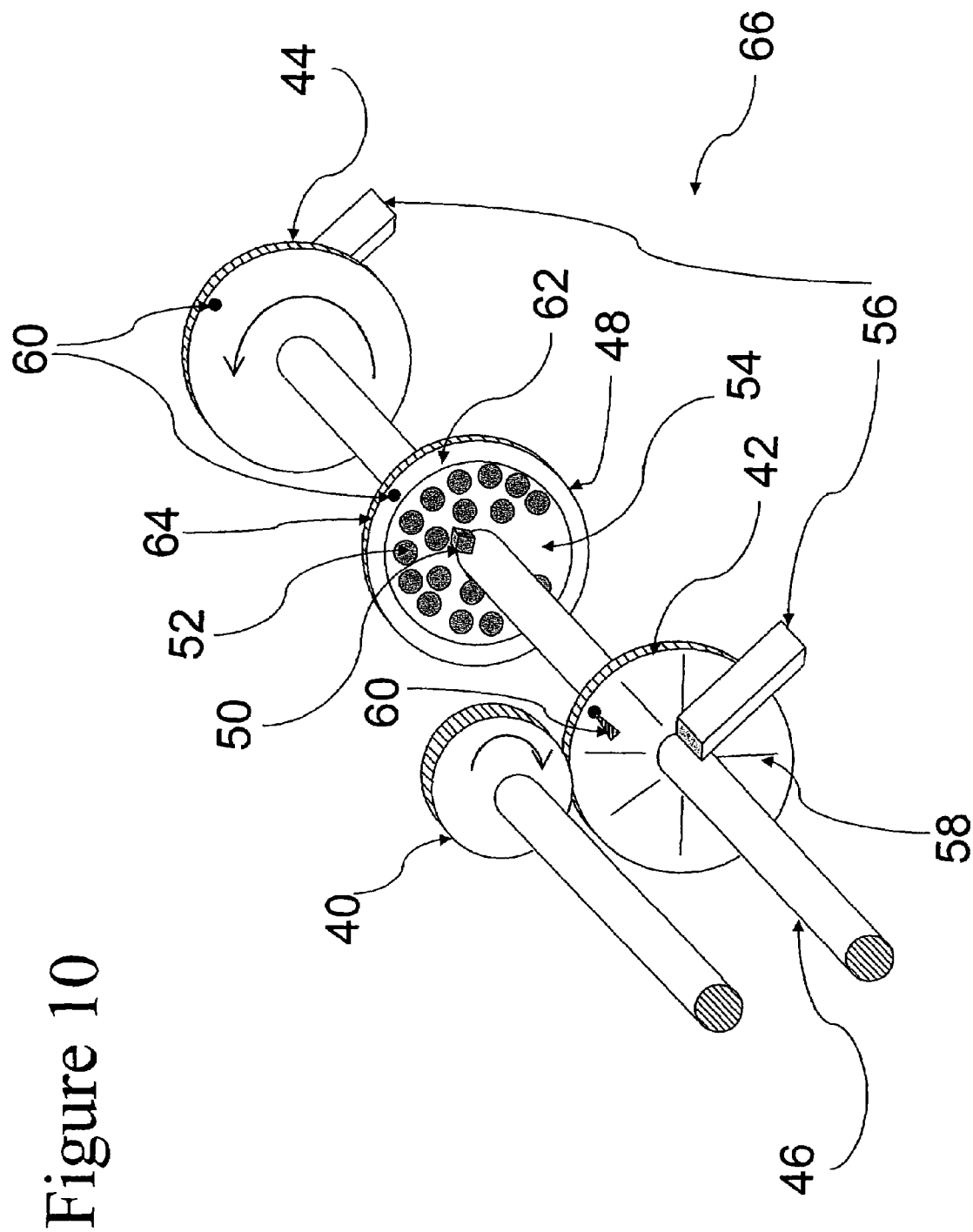
FIG. 10 shows an exploded perspective view of a preferred assembly for removing the combined flocculated magnetite and contaminant particulates from the water stream.

FIGS. 5-9 illustrate schematically a preferred magnetic separation unit 98. FIG. 5 shows the magnetic separation unit 98 in plan view, FIG. 6, an elevation of the unit 98, and FIGS. 7-9 are cross-sections taken along lines 7-7, 8-8, and 9-9, respectively, of FIG. 5. FIG. 10 shows an exploded perspective of a component thereof.

A Magnetic separation unit 98 unit is useful in the FIG. 1 embodiment of the invention, which removes non-magnetic pollutant particles from water using magnetic seeding technology. These particles may included heavy metals, precipitated after the two-stage process discussed in detail above, particles precipitated after a single-stage precipitation, or particulates present in the water stream, e.g., dirt—more specifically, silt, clay, organic waste, inorganic waste, metal precipitates, etc., in storm water, wash water, or the like. Briefly, removal of non-magnetic pollutant particles is accomplished by binding the pollutant particles to a magnetic seed material (preferably magnetite, ferrosilicon, or other known ferromagnetic compounds) using an organic flocculating polymer. A substantial fraction of the resultant magnetic particles are then removed by settling out, and the remainder by a permanent magnet disk collector, employed as discussed below in connection with FIG. 10.

Referring now to the detailed illustration of the apparatus shown in FIGS. 5-9, a stream of water to be treated flows into a flocculation chamber (72) at an inlet (70). A magnetic seed material (e.g., magnetite, ferrosilicon, hematite, ferrite, zero-valent iron, or others) and a flocculating polymer (e.g., Stockhausen 3040L) are added to the water stream in chamber 72. A floc mixer (87), driven by a motor (73) is provided to ensure the seed material and flocculant thoroughly contact the pollutant particles, so that a "floc", comprising the combination of the magnetic material and the particles to be removed, held together by the organic flocculating polymer, is efficiently formed. The floc exhibits ferromagnetic properties, so that it is attracted to a magnet. The water stream including the floc then flows out through a drain at the bottom of the flocculation chamber (72) and into a settling chamber (74), as indicated by arrows (81). Because of the high density of the floc, most of the flocculated particles will settle to the bottom of the settling chamber (74) and flow back into the flocculation chamber (72). More specifically, the bottom of the settling chamber (74a) is open to the flocculating chamber (72), and is angled, so the particles will move towards the flocculating chamber (72) and are swept away by the mixing action of the floc mixer (87). The water stream, having been cleaned, enters a trough (81) and then exits unit (98) at (78), while the flocculated particles that do not settle by gravity but remain suspended in the water stream are collected on a magnetic disk collector (76), due to the ferromagnetic properties of the seed material. As discussed in detail in connection with FIG. 10 below, the combined particles are scraped off the magnetic disk collector (76) and fall to the bottom of the settling chamber (74). The reason they are not re-entrained back onto the magnetic disk collector (76) after having been scraped therefrom, is that the particles possess a small magnetic charge that causes them to clump together after collection on the disk collector (76) and scraping therefrom. These clumps are heavy and settle rapidly to the bottom of the settling chamber (74), even though individual particles may not thus settle. Clean water, free of pollutant particles and magnetite, flows through the magnetic disk collector (76) and into a trough (81) and then into the outlet (78).

Over time, the magnetite becomes dirty with the precipitates and other fine pollutants and has to be cleaned so it can be reused. This is accomplished by collecting the dirty magnetite in the flocculation chamber (72) on a magnetic drum roller (80), mounted so as to be partially submerged in the flocculation chamber (72). The magnetic drum roller (80) is shown in more detail by FIG. 8. As illustrated, drum roller (80) (as well as other rollers discussed below) are driven by motor (79), through a gear train located above the water line to minimize the effects of abrasive magnetite on the gears. The combined particles adhere to the magnetized drum (80). Drum (80) may comprise a stationary inner ferromagnetic cylinder, lined with magnets, disposed within a rotating plastic outer cylinder. As drum (80) rotates, the magnetite rotates with it until it reaches a scraper (82), held firmly against the surface of rotating drum (80). The dirty magnetite then is scraped off the magnetic drum roller (80) by scraper (82), and then falls into a trough (83) at the front (in FIG. 5, that is) of the flocculating chamber (72), and flows downwardly, as indicated by arrows (83a) into a shear mixing chamber (93), in which is located a shear mixer, comprising a single speed motor (84), a mixer shaft (84a) and high shear mixer blades (89). The shear mixer uses mechanical forces to break the flocculation bond between the pollutant particles and the magnetite. The sheared liquid then flows (91) out of the shear chamber (93) and onto the surface of another, similarly-constructed gear-driven magnetic drum roller (86), which collects the clean magnetite. A second scraper (88) scrapes the clean magnetite into the flocculation chamber (72) for reuse. See FIG. 7. A semicircular trough 86a serves as a housing around the drum roller (86) and prevents the sludge that is not collected on the drum roller (86) from going back into the floc tank (72). Accordingly, the non-magnetic pollutant particles not collected by the magnetic drum roller (86) flow out of the unit (98) at an outlet (90) for dewatering and disposal, typically after processing by a conventional sludge dewatering system, employed to form a solid filter cake.

FIG. 10 shows an exploded perspective view of a set (66) of three disks; several similar sets (66) of such disks, which are disposed such that the top of the disks are just above the level of the water in settling tank 74 (FIGS. 5 and 6), comprise the magnetic disk collector (76). As noted, FIG. 9 shows an end view of the assembly (76). Each of the disks of each set (66) is made of plastic or other suitable non-ferromagnetic material such as 300 series stainless steel. Each set (66) comprises two outer wear disks (42, 44) which rotate freely around a fixed shaft (46), and a fixed inner magnet disk (48) which is attached to shaft (46) by a key (50) and does not rotate. A drive gear (40), which is mounted above the water, is driven by motor (79) and drives at least the wear disks (42, 44) of each set of disks by meshing with gear teeth formed on their peripheries. The outer wear disks (42) and (44) are secured to a ring gear (62), rotating freely on the periphery of inner magnet disk (48), e.g., by screws (60); ring gear (62) is driven by drive gear (40), so that the outer wear disks (42) and (44) rotate together with ring gear (62).

In use, wear disks (42, 44) are closely juxtaposed to the inner magnet disk (48), which contains permanent magnets (52), retained in recesses in disk (48), so that magnetic particles in the water, that is, the flocculated pollutant particles and magnetite or other ferromagnetic particles, are attracted to and retained on the outer surfaces of outer wear disks (42, 44), that is, on their surfaces not juxtaposed to inner disk (48).

A sector (54), e.g., the lower quadrant of the inner magnet disk (48) does not contain any permanent magnets (52), providing an area for scrapers (56) engaging the outer surfaces of the outer wear disks (42, 44) to clean the magnetic disk collector; that is, because the magnetite is not urged against the surfaces of the wear disks (42, 44) by the permanent magnets (52) in these areas, cleaning the magnetic disk collector by scraping becomes easier. It is preferable to form radially-extending score marks (58) on the outer surfaces of the wear disks (42, 44) to cause the magnetite to move to the region of the scrapers (56) as the wear disks (42, 44) rotate; if these surfaces are smooth, the magnetite tends to remain in the vicinity of the permanent magnets (52) and not move with the disks, and is thus not amenable to being removed by the scrapers (56). If the outer wear disks (42, 44) are formed of plastic, suitable score marks can be made by hand using a sharp implement or knife blade; if the disks are, for example, non-magnetic stainless steel, presumably a machine operation would be required. Having a sector void of magnets on the lower quadrant of the inner magnet disk (48) and having score marks (58) on the outer wear disks (42,44) are important to the design of the magnetic disk collector (66) because of the use of NdFeB permanent magnets, as is preferred. The NdFeB permanent magnets are extremely powerful, having a coercive field strength of 900-1000 kA/m. By comparison, in Nilsson U.S. Pat. No. 3,980,562, the preferred magnets have a coercive field strength of 100-200 kA/m.

Thus, the operation of the magnetic separation unit of FIGS. 5-9 can be summarized as follows: A stream of water containing particles to be removed therefrom is admitted to flocculation chamber (72) and is there mixed with particles of a ferromagnetic material and with a flocculating polymer, under mixing conditions such that a floc is formed. The mixing conditions are adjusted according to a fine balance between too much agitation, which breaks the floc, and insufficient agitation to keep the magnetite suspended. The magnetite needs to be in suspension in order to get good contact with the flocculating polymer in the floc tank and with new particles entering the tank. When this flow leaves the agitated floc tank into the settling tank the floc settles out, and slides down inclined wall 74a, back into the floc tank. More specifically, the water and floc leave the flocculation chamber (72) through an underflow (81) into the settling chamber (74). The flow rate through the settling chamber is such that most of the particles settle out and back into the flocculation chamber (72); a typical Surface Overflow Rate (SOR) is less than about 10 gallons per minute per square foot of surface area of the settling chamber (74). At this SOR, a smaller fraction of the floc remains suspended in the water stream, but is separated therefrom in magnetic disk collector 76 (detailed in FIG. 10); the "clumped" floc then settles and is removed as with the major portion having settled previously. Cleaned water is discharged through a trough (81) and outlet (78). Floc is attracted to the drum roller (80) and scraped therefrom by scraper (82) into trough (83); the magnetite is separated from the remainder of the floc in high-shear mixing chamber (93) and returned to the floc chamber (72) for reuse, while the pollutants and flocculating polymer are discharged at (90), for dewatering and disposal.

An advantage of this magnetite cleaning system is that the magnetite (or other magnetic seed material) is removed as a wet solid or heavy sludge, rather than as a slurry; the sludge requires much less further processing (e.g, dewatering) for reuse than would a slurry, and the process is accordingly less costly.

While several preferred embodiments of the invention have been disclosed, those of skill in the art will recognize that numerous modifications, enhancements and improvements thereto are possible without departure from the scope of the invention.

What is claimed is:

1. A method for removing heavy metals from a stream of water, comprising the following steps:
    (a) Precipitating heavy metals by adding lime, limestone, caustic, magnesium hydroxide, soda ash or any other material that will precipitate a substantial fraction of the heavy metals as hydroxides or carbonates;
    (b) Removing the precipitated heavy metals formed in step (a) by gravity clarification methods or by field separation methods selected from the group consisting of magnetic separation, dissolved air flotation, vortex separation, expanded plastic flotation or any other method that uses field forces rather than filtration to remove particles from the water;
    (c) Precipitating the residual heavy metals remaining in solution after steps (a) and (b) by using organic sulfides, inorganic sulfides, sodium borohydride, ferrous compounds, or any other chemical that can precipitate more metals from the water than hydroxide and carbonate chemicals; and
    (d) Removing the heavy metals precipitated in step (c) by field separation methods selected from the group consisting of gravity clarification, magnetic separation, dissolved air flotation, vortex separation, expanded plastic flotation or any other method that uses field forces rather than filtration to remove particles from the water;
    (e) wherein at least one of said removal steps (b) or (d) is performed by magnetic separation using a bonding agent comprising an organic flocculating polymer to attach magnetic seed material to precipitated particles, forming a floc, wherein a portion of the floc is removed by settling, and the remainder of the floc is removed by magnetic forces, wherein the steps of using a bonding agent to attach the magnetic seed material to the particles to be removed and the step of removal of the magnetic seed material with the particles to be removed attached thereto are performed in the same vessel, and wherein the remainder of the floc is collected on magnetic surfaces at least partially submerged in the water from which the floc is to be removed, and is removed from the magnetic surfaces by scraping the collected floc therefrom.

2. The method of claim 1, wherein said magnetic surfaces are provided on pairs of outer collection disks formed of nonmagnetic material between which is disposed a central disk, comprising a plurality of magnets, so that magnetic particles are attracted to outer surfaces of said collection disks.

3. The method of claim 2, wherein said outer collection disks are rotated with respect to said central disk, said magnets are absent from said central disk in at least a sector thereof, and scraper blades are urged against said outer disks at positions opposite said sector from which magnets are absent.

4. The method of claim 3, wherein said sector of said central disk from which magnets are absent is its lower section, whereby particles scraped from said outer collection disks fall away from said collection disks by gravity.

5. The method of claim 3, wherein said outer collection disks are of plastic, and their outer surfaces are treated to increase adhesion of said floc thereto.

6. The method of claim 2, wherein said magnets comprise NdFeB material.

7. The method of claim 1, wherein the magnetic seed material is selected from the group consisting of magnetite ($Fe_3O_4$), ferrite, hematite, zero-valent iron, and ferrosilicon.

8. The method of claim 1 comprising the further step of separating the metal precipitates from the magnetic seed material, for reuse of the magnetic seed material.

9. The method of claim 8, wherein the metal precipitates are separated from the magnetic seed material by mechanical force.

10. The method of claim 1 wherein the heavy metals to be removed from water include cadmium, chromium, copper, lead, mercury, nickel, zinc and combinations thereof.

11. A method for removing particulate material from water, comprising the steps of:
    (a) admitting a stream of water to be treated to a vessel such that the water remains therein for a residence time;
    (b) providing magnetic seed particles and a flocculating polymer in said vessel as necessary so that said particulates are adhered to magnetic seed particles by said flocculating polymer, forming a floc;
    (c) allowing a first portion of said floc to settle out of the water;
    (d) removing the remainder of said floc by passing the water containing the remainder of the floc past one or more magnetized surfaces in said vessel at least partially submerged in the water from which the floc is to be removed, such that the remainder of the floc is collected on the magnetized surface(s);
    (e) removing the remainder of the floc from the magnetized surface(s) of the disks by scraping the collected floc therefrom, so that the removed floc is returned to the vessel;
    (f) removing a stream of cleansed water from the vessel; and (g) separating the particulates from the magnetic seed material, for reuse of the magnetic seed material; wherein the settling, flocculation, and magnetic collection steps are performed in the same vessel.

12. The method of claim 11, wherein said magnetic surfaces each comprise a pair of outer collection disks formed of nonmagnetic material between which is disposed a central disk, comprising a plurality of magnets, so that magnetic particles are attracted to outer surfaces of said collection disks.

13. The method of claim 12, wherein said outer collection disks are rotated with respect to the central disk, said magnets are absent from at least a sector of said central disk and scraper blades are urged against said outer disks at positions opposite said sector from which magnets are absent.

14. The method of claim 13, wherein said sector of said central disk from which magnets are absent is its lower section, whereby particles scraped from said outer collection disks fall away from said collection disks.

15. The method of claim 12, wherein said magnets comprise Neodymium-Iron-Boron (NdFeB) material.

16. The method of claim 12, wherein said outer collection disks are of plastic or non-magnetic metal, and their outer surfaces are treated to increase adhesion of said floc thereto.

17. The method of claim 11, wherein the magnetic seed material is selected from the group consisting of magnetite ($Fe_3O_4$), ferrite, hematite, zero-valent iron, and ferrosilicon.

18. The method of claim 11, wherein the metal precipitates or fine contaminant particles are separated from the magnetic seed material by mechanical force.

19. The method of claim 11, wherein the particles to be removed from water include precipitates, clay, silt, organic material and combinations thereof having a particle size of less than 200 microns.

20. The method of claim 11, wherein the waters to be thus treated include industrial wastewater, municipal wastewater, potable water, makeup water, groundwater, surface water, stormwater, and combinations thereof.

21. The method of claim 11, wherein said magnetized surface(s) are submerged in the water in the vessel, and the stream of cleansed water is withdrawn from the surface of the water.

22. The method of claim 11, wherein said step of separating the particulates from the magnetic seed material, for reuse of the magnetic seed material is performed in the same vessel as said settling, flocculation, and magnetic collection steps.

23. The method of claim 11, wherein said magnetic surfaces are formed by at least one magnetic drum, such that magnetic particles are attracted to outer surfaces of said magnetic drum(s), and a scraper is provided juxtaposed to each drum to scrape the floc from the surface of the drum and return the floc to the vessel.

24. A method for removing dissolved heavy metals from water, comprising the following steps:
(a) precipitating heavy metals by adding lime, limestone, caustic, magnesium hydroxide, soda ash or any other material that will precipitate the heavy metals as hydroxides or carbonates;
(b) removing the precipitated heavy metal formed in step (a) by gravity clarification methods or by field separation methods selected form the group consisting of magnetic separation, dissolved air flotation, vortex separation, expanded plastic flotation or any other method that uses field forces rather than filtration to remove particles from the water;
(c) precipitating the residual heavy metal remaining in solution after steps (a) and (b) by addition of organic sulfides, inorganic sulfides, sodium borohydride, ferrous compounds, or any other chemical that can precipitate more metals from the water than hydroxide and carbonate chemicals; and
(d) removing the heavy metals precipitated in step (c) by field separation methods selected from the group consisting of gravity clarification, magnetic separation, dissolved air flotation, vortex separation, expanded plastic flotation or any other method that uses field forces rather than filtration to remove the particles from the water; and
(e) wherein a bonding agent comprising an organic flocculating agent is employed in at least one of steps (b) or (d) to attach metal precipitates or other fine particles to expanded plastic with a density less than water, so that the attached particles can be removed by flotation forces.

25. The method of claim 24, wherein the expanded plastic is expanded polystyrene.

26. The method of claim 24, comprising the further step of separating the expanded plastic from the metal precipitates or fine particles for reuse by application of mechanical force.

27. The method of claim 24, wherein the heavy metals to be removed from water include cadmium, chromium, copper, lead, mercury, nickel, zinc and combinations thereof.

28. A method for removing particulates from water, comprising the steps of:
(a) adding particles of positively-charged expanded plastic to the water;
(b) employing a negatively-charged organic flocculating agent to cause said particulates to be adhered to said particles of expanded plastic forming particles, forming attached particles with a density less than water, so that the attached particles float on the surface of the water;
(c) withdrawing clean water from beneath the surface of the floating attached particles;
(d) removing the particulates and expanded plastic; and
(e) cleaning and reusing the expanded plastic.

29. The method of claim 28, wherein the expanded plastic is expanded polystyrene.

30. The method of claim 28, wherein the step of cleaning the expanded plastic is performed by separating it from the particulates by the application of mechanical force.

31. The method of claim 28, wherein the particles to be removed from water include precipitates, clay, silt, organic material and combinations thereof having a particle size of less than 200 microns.

32. The method of claim 28, wherein the waters to be thus treated include industrial wastewater, municipal wastewater, potable water, makeup water, groundwater, surface water, stormwater, and combinations thereof.

33. The method of claim 28, wherein said expanded plastic is positively charged by addition of a cationic polymer.

34. The method of claim 28, wherein said organic flocculating agent is an anionic polymer.

* * * * *